United States Patent
Sasaki et al.

[19]

[11] Patent Number: 5,839,339
[45] Date of Patent: Nov. 24, 1998

[54] MITER SAW

[75] Inventors: Katsuhiko Sasaki; Mitsuyoshi Niinomi; Yoshinori Shibata, all of Anjo, Japan

[73] Assignee: Makita Corporation, Aichi-ken, Japan

[21] Appl. No.: 916,954

[22] Filed: Aug. 25, 1997

Related U.S. Application Data

[63] Continuation of Ser. No. 660,882, Jun. 10, 1996, Pat. No. 5,660,094, which is a continuation of Ser. No. 408,163, Mar. 21, 1995, Pat. No. 5,582,089, which is a continuation of Ser. No. 63,291, May 18, 1993, Pat. No. 5,437,214.

[30] Foreign Application Priority Data

May 22, 1992 [JP] Japan ................................. 4-156010
Aug. 27, 1992 [JP] Japan ................................. 4-252214

[51] Int. Cl.[6] ....................................................... B27B 5/36
[52] U.S. Cl. ........................... 83/471.3; 83/473; 83/477.1; 83/564; 83/581; 83/490
[58] Field of Search ................................. 83/471.3, 473, 83/477.1, 564, 581, 490; 403/111–113, 117

[56] References Cited

U.S. PATENT DOCUMENTS

| 258,794 | 5/1882 | Moss | 403/112 |
|---|---|---|---|
| 723,544 | 5/1903 | Petre | 403/117 |
| 1,646,589 | 10/1927 | Meek et al. | |
| 1,808,453 | 6/1931 | DeKoning | 83/471.3 |
| 2,530,290 | 11/1950 | Collins | 83/473 |
| 2,551,670 | 5/1951 | Hannson | 403/111 |
| 2,576,090 | 11/1951 | Krause | 83/473 |
| 2,652,863 | 9/1953 | Grabinski | 83/473 |
| 4,152,961 | 5/1979 | Batson | 83/471.3 |
| 4,452,117 | 6/1984 | Brickner et al. | 83/468.3 |
| 4,537,105 | 8/1985 | Bergler | |
| 4,869,142 | 9/1989 | Sato et al. | 83/471.3 |
| 5,216,964 | 6/1993 | Sato et al. | 83/471.3 |

FOREIGN PATENT DOCUMENTS

| 1135035 | 4/1957 | France. |
| 1379222 | 10/1964 | France. |
| 2050610 | 5/1971 | Germany. |
| 2321020 | 11/1974 | Germany. |
| 3737814 | 9/1988 | Germany. |
| 63-49901 | 5/1988 | Japan. |

*Primary Examiner*—Maurina T. Rachuba
*Attorney, Agent, or Firm*—Dennison, Meserole, Pollack & Scheiner

[57] ABSTRACT

A miter saw includes a support mechanism for supporting a miter saw unit relative to a base in such a manner that the miter saw unit is both vertically and laterally pivotable. A position determining mechanism serves to selectively determine the position of the saw unit at any of positions including a vertical position where a saw blade is positioned substantially vertically relative to the base, and leftward and rightward pivoted positions where the saw blade is inclined laterally leftwardly and laterally rightwardly from the vertical position by a predetermined angle, respectively. The position determining mechanism includes movable side stopper members and fixed side stopper members on which the movable side stopper members abut, respectively. The movable side stopper members are mounted on a movable member which pivots laterally with the miter saw unit. The fixed side stopper members are mounted on a fixed member which is non-laterally pivotally movably mounted on the base. The movable side stopper members abut on their corresponding fixed side stopper members when the miter saw unit is at the vertical position and at the leftward and rightward pivoted positions, respectively.

6 Claims, 25 Drawing Sheets

MITER SAW

This is a Continuation of application Ser. No. 08/660,882 now U.S. Pat. No. 5,660,094 filed Jun. 10, 1996, which is a continuation of application Ser. No. 08/408,163, filed Mar. 21, 1995, now U.S. Pat. No. 5,582,089 which is a continuation of application Ser. No. 08/063,291, filed May 18, 1993 now U.S. Pat. No. 5,437,214.

BACKGROUND OF THE INVENTION

1. Field of the Invention

The present invention relates to a miter saw, and more particularly to a miter saw in which a miter saw unit supporting a saw blade is pivotable to incline the saw blade relative to a base for placing a work thereon.

2. Description of the Prior Art

A conventional miter saw having a miter saw unit pivotable to incline a saw blade relative to a base is used to obliquely cut a work placed on the base.

In order to permit such an inclined positioning of the miter saw unit, Japanese Laid-Open Utility Model Publication No. 63-49901 proposes a miter saw having a support arm (a hinge member) which vertically pivotally supports a miter saw unit and which is laterally pivotally mounted on a base. The support arm includes an arcuate slot formed in the lateral pivotal direction. A screw is inserted into the arcuate slot and is engaged with a part of the base, so that the support arm is kept in position at a vertical position or a laterally leftwardly or rightwardly pivoted position.

However, with the prior art construction, since it depends on the tightening force of the screw to keep especially the vertical position of the support arm with the screw positioned at the central portion of the arcuate slot, it is not possible to precisely determine the vertical position of the support arm. Further, since the adjustment of the position must be made every time the support arm is returned from the laterally pivoted position to the vertical position, the adjustment operation is very troublesome. Additionally, because of such dependency on the tightening force of the screw to keep the vertical position, the vertical position may be easily displaced when the screw has been loosened, and therefore, the vertical position cannot be reliably kept. Furthermore, since the determination of the laterally pivoted position of the support arm is performed through abutment of a shaft of the screw on either of the ends of the arcuate slot, the laterally pivoted position cannot be reliably determined and the adjustment of the laterally pivoted position cannot be made.

SUMMARY OF THE INVENTION

It is, accordingly, an object of the present invention to provide a miter saw which includes a miter saw unit pivotable to incline a saw blade and which permits easy and reliable determination of a vertical position of the miter saw unit as well as of both laterally pivoted positions of the same.

According to the present invention, there is provided a miter saw comprising:

a base on which a work is placed;

a miter saw unit supporting a saw blade and having a motor for rotatably driving the saw blade;

a support mechanism for supporting the miter saw unit relative to the base in such a manner that the miter saw unit is both vertically and laterally pivotable;

a position determining mechanism for selectively determining the position of the miter saw unit at any of the positions including a vertical position where the saw blade is positioned substantially vertically relative to the base, and leftward and rightward pivoted positions where the saw blade is inclined laterally leftwardly and laterally rightwardly from the vertical position by a predetermined angle, respectively;

the position determining mechanism including movable side stopper members and fixed side stopper members on which the movable side stopper members abut, respectively, the movable side stopper members being mounted on a movable member which pivots laterally with the miter saw unit, the fixed side stopper members being mounted on a fixed member which is non-laterally pivotally movably mounted on the base, the movable side stopper members abutting on their corresponding fixed side stopper members when the miter saw unit is at the vertical position and at the leftward and rightward pivoted positions, respectively.

The invention will become more apparent from the appended claims and the description as it proceeds in connection with the drawings.

DETAILED DESCRIPTION OF THE PREFERRED EMBODIMENTS (First Embodiment)

A first embodiment of the present invention will now be explained with reference to the accompanying drawings.

Figure 1:
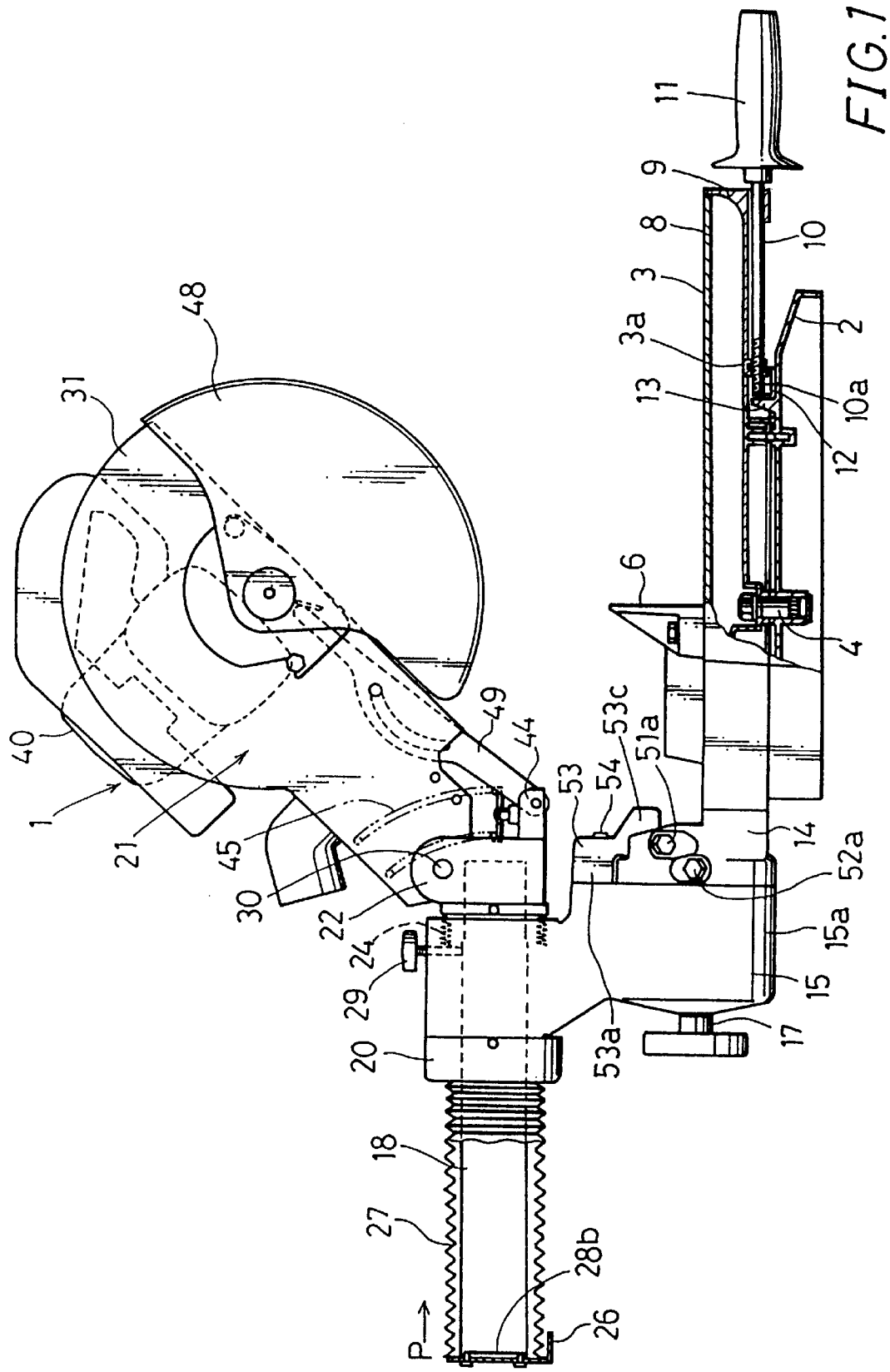
FIG. 1 is a side view, with a part broken away, of a miter saw according to a first embodiment of the present invention.

Referring to FIG. 1, there is shown a slide-type miter saw 1 generally including a base 2 and a miter saw unit 21 mounted thereon. The base 2 is served to place a work (not shown) thereon. The miter saw unit 21 is served to support a circular saw blade 36 and a motor 41 which drives the saw blade 36.

Figure 2:
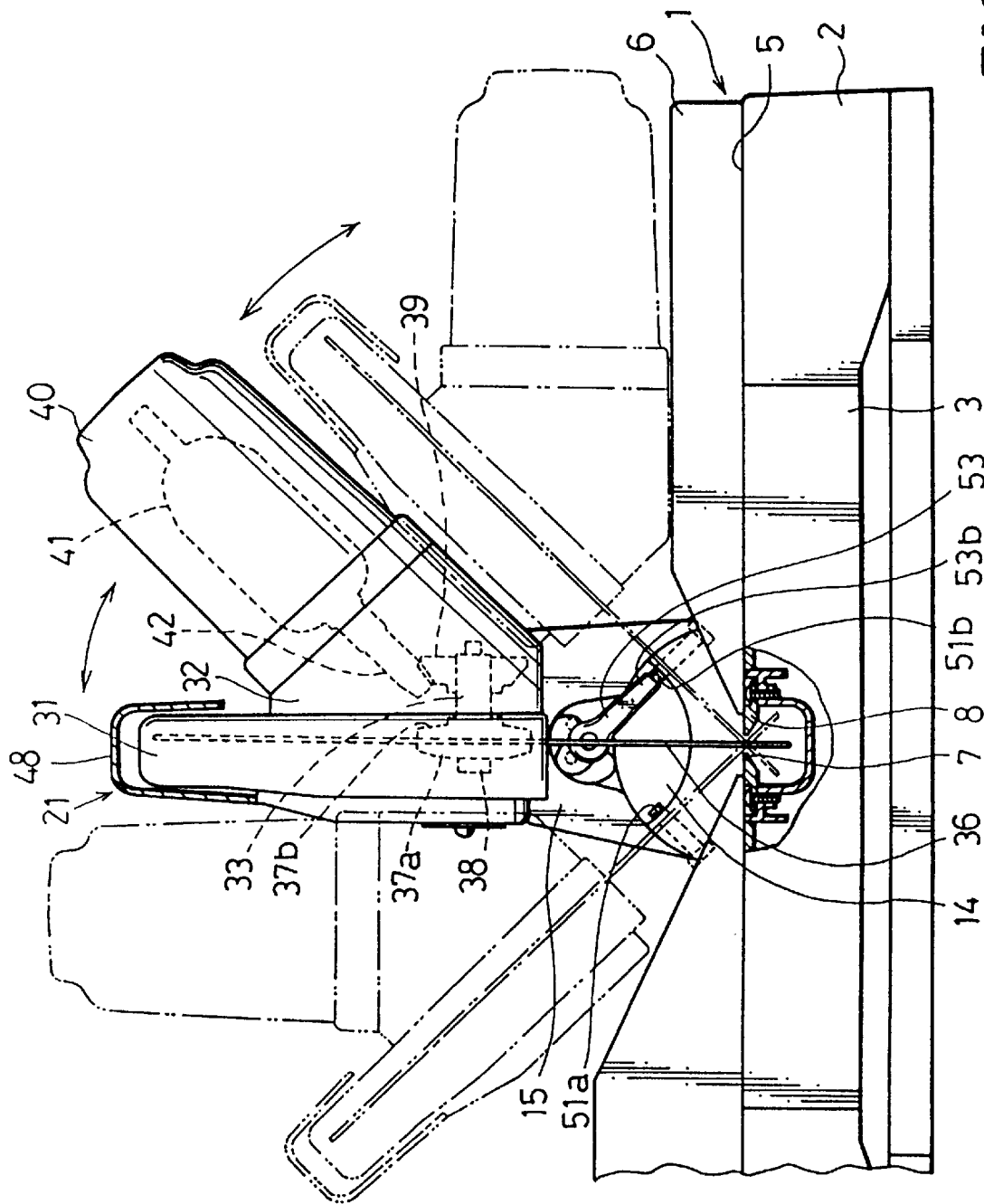
FIG. 2 is an enlarged front view, with a part broken away, of the miter saw.

As shown in FIGS. 1 and 2, the base 2 has a flat configuration and includes a substantially disc-like turntable 3. The turntable 3 is rotatably supported by the base 2 through a vertical support shaft 4 mounted on the central portion of the base 2. Thus, the turntable 3 is rotatable within a horizontal plane. The rotation of the turntable 3 is, however, limited within a predetermined angle. Work support tables 5 are integrally formed on both lateral sides of the base 2. Each of the work support tables 5 has an upper surface which is positioned in substantially the same plane as an upper surface of the turntable 3. A fence 6 extends between the work support tables 5 over the turntable 3 and is positioned on the rear side (left side in FIG. 1) of the work support tables 5. A plate 8 is mounted on the turntable 3 and extends in a diametrical direction of the turntable 3. The plate 8 includes a cut-out recess 7 which is adapted to permit intrusion of the saw blade 36. A support arm 9 extends forwardly outwardly from the periphery of the turntable 3 and is mounted below one end of the plate 8 which extends beyond the periphery of the turntable 3. A support rod 10 is rotatably mounted on the lower portion of the support arm 9 and includes a grip 11 at its forward end. The support rod 10 includes, at its rear portion, a threaded portion 10a which is in engagement with a corresponding threaded hole formed on a protrusion 3a extending downwardly from the turntable 3. The rear end of the support rod 10 is opposed to a wall portion 13 formed on the base 2. A substantially U-shaped leaf spring 12 is interposed between the rear end of the support rod 10 and the wall portion 13. The wall portion 13 has an arcuate configuration corresponding substantially to a locus of rotation of the turntable 3.

A bracket 14 is integrally formed with the peripheral portion of the turntable 3 at a position rearwardly of the plate 8. A support member 15 which supports the miter saw unit 21 is pivotally mounted on the bracket 14 in such a manner that the support member 15 is pivoted laterally leftwardly and laterally rightwardly from a vertical position perpendicular to the upper surface of the base 2.

Figure 4:
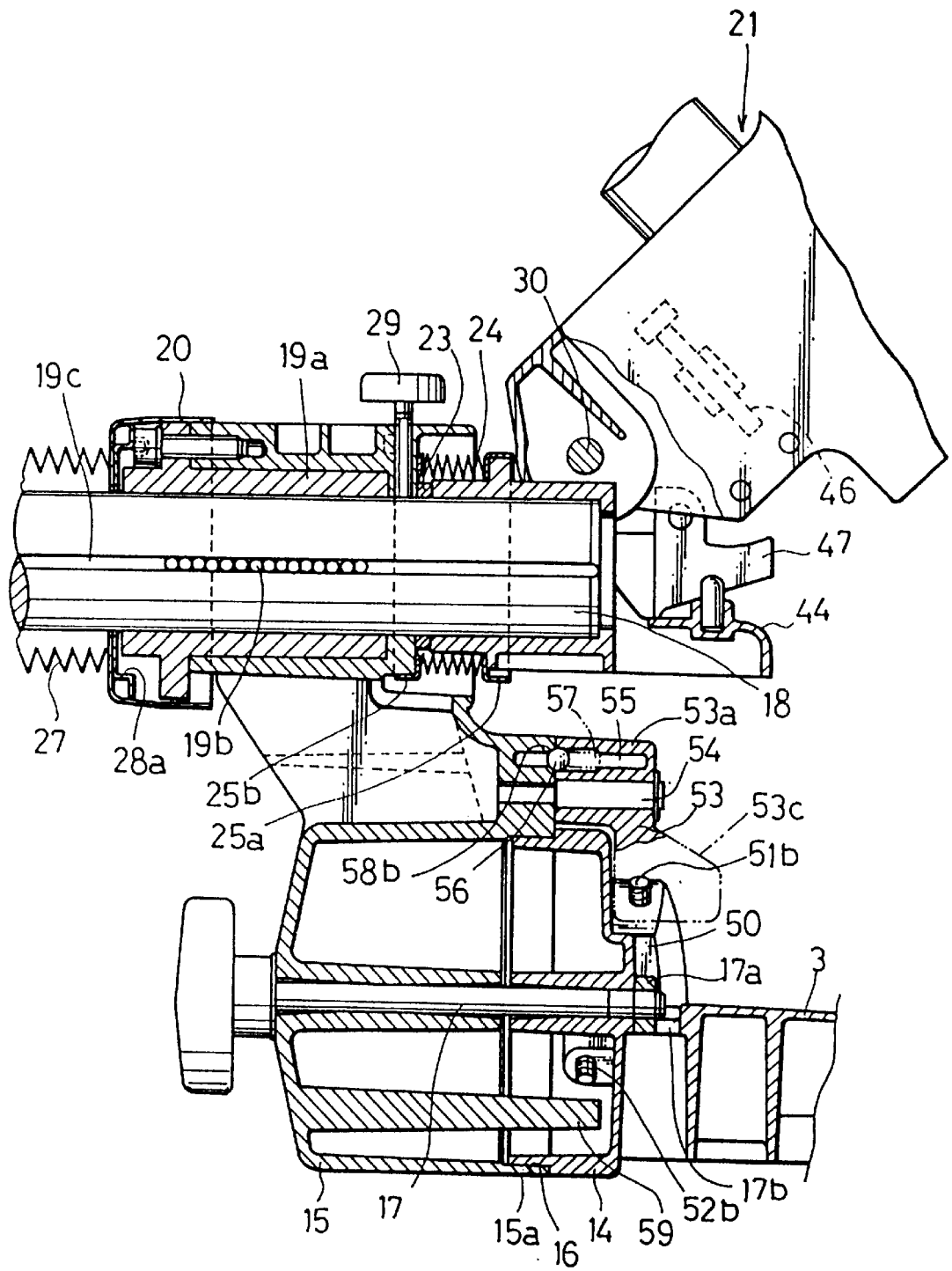
FIG. 4 is an enlarged sectional view of a support mechanism of the miter saw unit.

As shown in FIG. 4, a cylindrical support shaft 16 is formed with the rear end of the bracket 14. The support member 15 includes a cylindrical boss portion 15a which is rotatably fitted on the support shaft 16 of the bracket 14.

A mechanism to releasably fix the position of the support member 15 relative to the bracket 14 is provided and includes a support bolt 17 and a nut 17a for engagement with the support bolt 17. The support bolt 17 is inserted through the central portion of the boss portion 15a and through the central portion of the support shaft 16. One end of the support bolt 17 extends outwardly from the boss portion 15a and includes a knob for operation by an operator. The other end of the support bolt 17 extends outwardly from the support shaft 16 and is in engagement with the nut 17a. The nut 17a is partly received by a recess 17b which is formed on the turntable 3 and has a configuration corresponding substantially to a half of the nut 17a, so that the nut 17a is prevented from rotation relative to the turntable 3.

A slide bar 18 is horizontally slidably mounted on the upper portion of the support member 15. More specifically, the slide bar 18 is slidably received within a tubular bearing 19a which is fixedly fitted within a corresponding tubular support formed on the upper portion of the support member 15. Here, the tubular bearing 19a is constructed as an angular ball spline. Thus, a pair of longitudinal recesses (not shown) are formed on the inner surface of the tubular bearing 19a at positions diametrically opposed to each other, and a pair of longitudinal recesses 19c corresponding to the longitudinal recesses of the tubular bearing 19a are formed on the outer surface of the slide bar 18. A plurality of bearing balls 19b are received within the longitudinal recesses of the tubular bearing 19a on one side and are received within the longitudinal recesses 19c of the slider bar 18 on the other side. The slide bar 18 is therefore slidable in the longitudinal direction relative to the tubular bearing 19a with the aid of bearing balls 19b but is prevented from rotation relative to the tubular bearing 19a. A cap 20 is mounted on the rear end of the upper portion of the support member 15 so as to cover the rear end of the tubular bearing 19a.

A forked bracket-like hinge member 22 is fixed to the forward end of the slide bar 18 which extends from the support member 15. The hinge member 22 vertically pivotally supports the miter saw unit 21 and includes a damper ring 23 disposed at the rear end for abutment on the forward end of the upper portion of the support member 15. A first bellows member 24 is disposed between the hinge member 22 and the upper portion of the support member 15 and protects the forward part of the slide bar 18 exposed to the outside. Mounting rings 25a and 25b are interposed between the hinge member 22 and the first bellows member 24 and between the first bellows member 24 and the support member 15, respectively. A stopper member 26 having substantially L-shaped configuration as shown in FIG. 1 is screwed on the rear end of the slide bar 18 so as to limit the forward movement of the slide bar 18 through abutment on the cover member 20. A second bellows member 27 is disposed between the stopper member 26 and the cover member 20 so as to protect the rear part of the slide bar 18 exposed to the outside. Mounting members 28a and 28b are provided for mounting the second bellows member 27 on the stopper member 26 and the cover member 20, respectively (see FIGS. 1 and 4). A bolt 29 is screwed into the upper part of the support member 15 in a radial direction, so that the bolt 29 abuts on the outer surface of the slide bar 18 so as to fix the slide bar 18 relative to the support member 15 when tightened.

Figure 3:
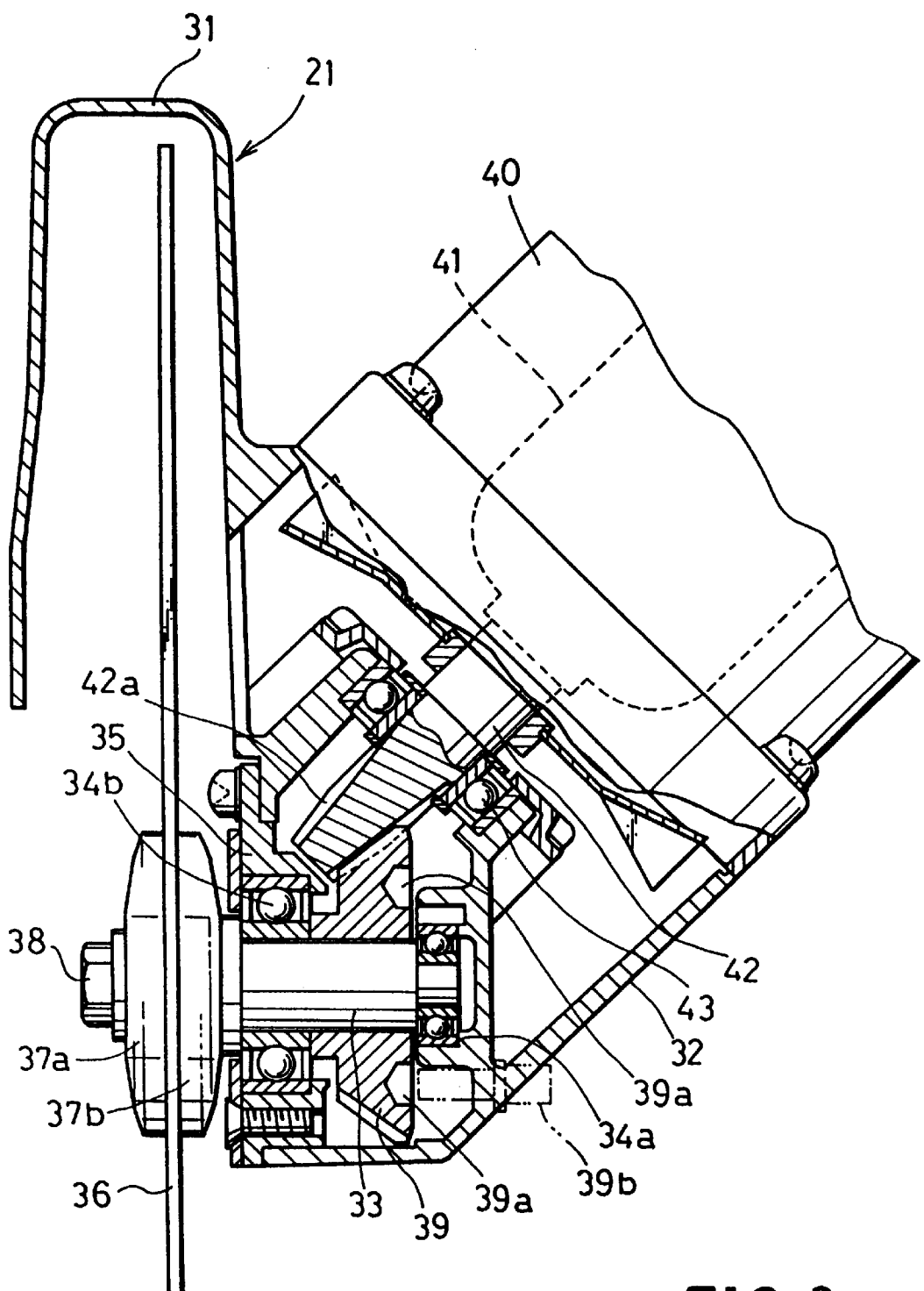
FIG. 3 is an enlarged sectional view of a part of a miter saw unit of the miter saw.
Figure 5:
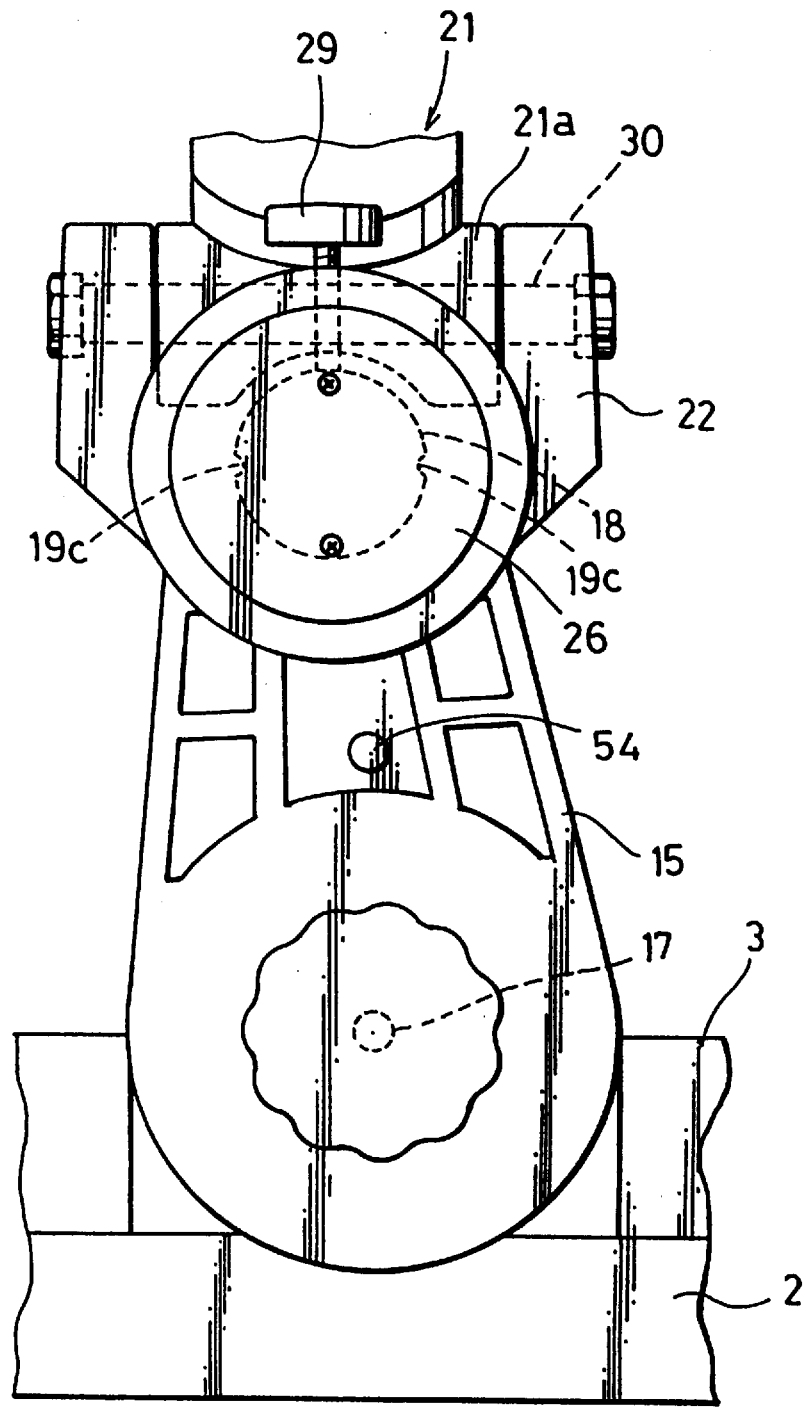
FIG. 5 is a rear view of FIG. 4.

The miter saw unit 21 includes, at its base portion, a boss 21a which is pivotally supported by the hinge member 22 through a support shaft 30 as shown in FIG. 5. As shown in FIGS. 1 to 3, the miter saw unit 21 has a blade case 31 which covers substantially the upper half of the saw blade 36. A gear case 32 is integrally formed with the blade case 31 and extends laterally obliquely therefrom at an angle of 45° relative to the saw blade 36. A spindle 33 is disposed within the lower portion of the gear case 32 and is rotatably supported by a bearing 34a and a bearing 34b which is mounted on the gear case 32 through a retainer 35. The spindle 33 is positioned in parallel with the upper surface of the turntable 3 when the miter saw unit 21 is at a vertical position where the saw blade 36 is positioned perpendicular to the upper surface of the base 2 or the turntable 3. One end of the spindle 33 extends into the blade case 31, and the saw blade 36 is detachably mounted on the one end of the spindle 33 through a pair of mounting flanges 37a and 37b and a bolt 38 which is operable to clamp the saw blade 36 between the mounting flanges 37a and 37b. A bevel gear 39 having a chip angle of 45° and acting as a reduction gear is fixedly mounted on the spindle 33 at a position within the gear case 32.

The gear case 32 includes an open upper end on which a motor housing 40 is fixedly mounted to extend in the same direction as the gear case 32. The motor 41 is disposed within the motor housing 40 and includes a motor shaft 42. The motor shaft 42 extends into the gear case 32 and is rotatably supported by the gear case 32 through a bearing 43. A spur gear 42a is integrally formed with the motor shaft 42 and is positioned above the bevel gear 39 so as to engage the same. Thus, the motor 41 as well as the motor shaft 42 is disposed upwardly of the spindle 33 and is inclined upwardly relative to the spindle 33 at an angle of 45°. A plurality of holes 39a are formed on one end surface of the bevel gear 39 and are spaced from each other in a circumferential direction. A lock pin 39b is movably mounted on the gear case 32 for engagement with either of the holes 39a, so that the rotation of the spindle 33 can be positively stopped when the lock pin 39b engages either of the holes 39a, so that the saw blade 36 can be exchanged to another one.

As shown in FIG. 1, a compression spring 45 is interposed between the base portion of the miter saw unit 21 and the bracket 44 protruding forwardly from the hinge member 22, so that the miter saw unit 21 is normally urged upwardly. As shown in FIG. 4, a stopper bolt 46 is mounted on the base portion of the miter saw unit 21 for abutting on a stopper member 47 which protrudes forwardly from the hinge member 22. The stopper bolt 46 determines the downward stroke end of the miter saw unit 21 through abutment on the stopper member 47 and is operable by the operator to change the downward stroke end. A safety cover 48 is rotatably mounted on the blade case 31 around the same axis as the saw blade 36 or the spindle 33 so as to uncover the half of the saw blade 36 exposed from the blade case 31. The safety cover 48 is operably connected to an operation link 49 which is pivotally mounted on the bracket 44 of the hinge member 22 in such a manner that the safety cover 48 rotates to uncover the saw blade 36 as the miter saw unit 21 is moved downwardly from the uppermost position.

Figure 6:
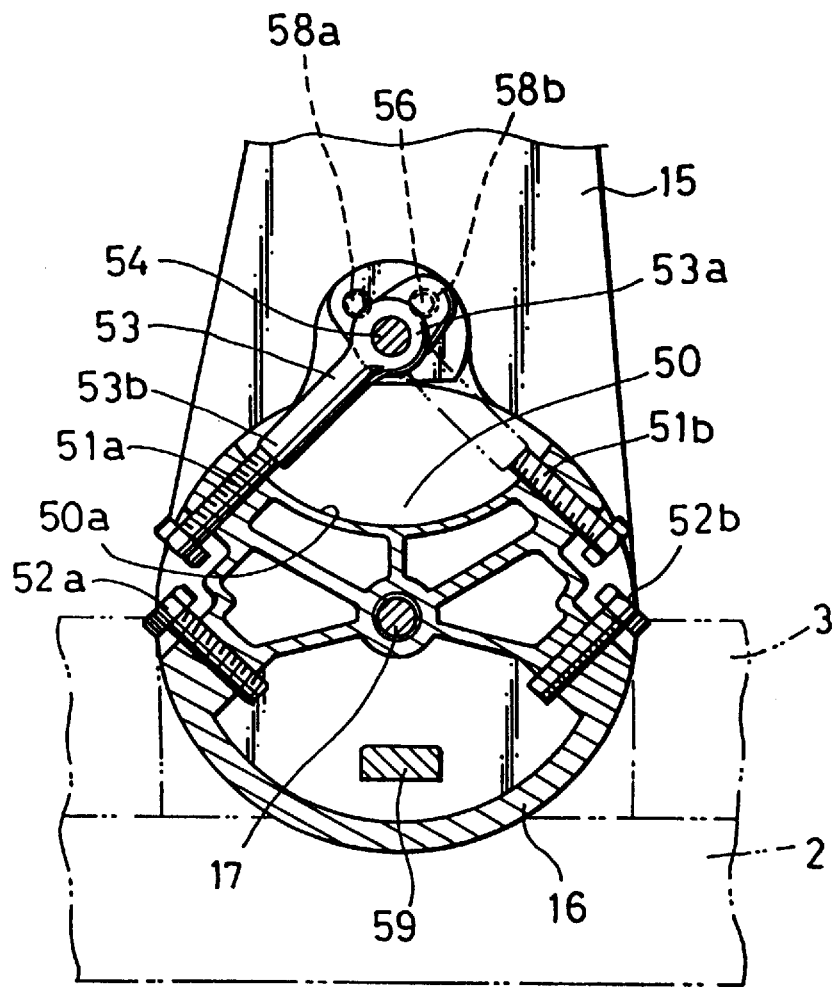
FIG. 6 is an enlarged sectional view showing the relationship between a stopper lever and a first and second pair of stopper bolts of the support mechanism.
Figure 7:
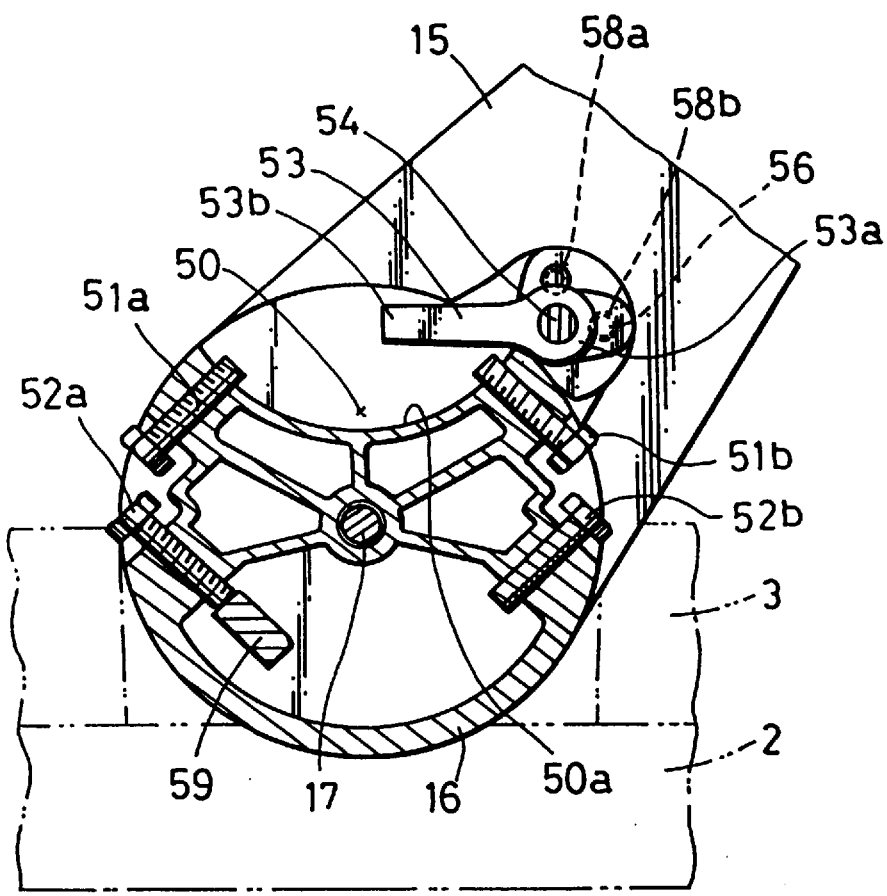
FIGS. 7 to 9 are views similar to FIG. 6 but showing different operations.

Returning to FIG. 4, a recess 50 is formed on the front portion of the upper half of the bracket 14 and is opened at its upper portion. As shown in FIG. 6, the recess 50 has an arcuate bottom surface 50a. A first pair of stopper bolts 51a and 51b are screwed into the upper half of the bracket 14 and have one ends extending upwardly from the bottom surface 50a. The stopper bolts 51a and 51b are positioned on the opposite sides of a vertical plane which passes through the central axis of the support bolt 17. The stopper bolts 51a and 51b are inclined obliquely relative to the vertical plane by an angle of 45°, respectively. A second pair of stopper bolts 52a and 52b are screwed into the lower half of the bracket 14 and extend obliquely downwardly relative to the vertical plane at an angle of 45°, respectively, on the opposite sides of the vertical plane. A stopper lever 53 is pivotally mounted on a front surface of the middle portion of the support member 15 and includes, at its upper portion, a boss 53a which is rotatably supported by the support member 15 through a support pin 54. The stopper lever 53 includes a stopper portion 53b positioned within the recess 50. The lower end of the stopper portion 53b can be selectively positioned for abutment on the upper end of one of the pair of the stopper bolts 51a and 51b through pivotal movement of the stopper lever 53. An extension 53c is integrally formed with the front portion of the stopper portion 53b for operation by the operator. The longitudinal axis of the support pin 54 is positioned on the vertical plane which passes through the central axis of the support bolt 17. The boss 53a of the stopper lever 53 slidably contacts the front surface of the middle portion of the support member 15. Further the boss 53a includes a longitudinal hole 55 in which an engaging ball 56 is partly received. The engaging ball 56 is biased toward the front surface of the support member 15 by a spring 57. On the other hand, the front surface of the support member 15 includes engaging recesses 58a and 58b which are leftwardly and rightwardly displaced from the vertical plane around the axis of the support pin 54 at an angle of 45°, respectively. Thus, the stopper lever 53 can be kept in position where the stopper portion 53b is in alignment with either of the stopper bolts 51a and 51b when the engaging ball 56 is brought into engagement with either of the engaging recesses 58a and 58b. A stopper member 59 having substantially rectangular configuration in section is integrally formed with the boss portion 15a of the support member 15 and extends horizontally within the lower part thereof. The end portion of the stopper member 59 protrudes into the bracket 14 for abutment on either of the second pair of the stopper bolts 52a and 52b. The stopper member 59 is positioned on the vertical plane which passes through the central axis of the support bolt 17 and that of the support pin 54.

The operation of the above embodiment will now be explained in connection with the operation for inclining the miter saw unit 21 laterally leftwardly or laterally rightwardly relative to the vertical position as well as the oblique cutting operation through movement of the miter saw unit 21 in the horizontal direction relative to the base 2.

Firstly, the support bolt 17 is loosened to some extent to permit lateral pivotal movement of the support member 15 relative to the bracket 14. As the support member 15 is pivoted rightwardly in FIG. 2 around the bracket 14, the miter saw unit 21 is moved together with the support member 15 to be inclined from the vertical position shown by a solid line to a rightward position shown by a chain line in FIG. 2 where the saw blade 36 is inclined at an angle of 45° relative to the vertical plane. At this stage, the stopper portion 53b is moved away from the left side stopper bolt 51a of the first pair and lies substantially horizontally while left side surface of the stopper member 59 abuts on the left side stopper bolt 52a of the second pair. Further, the motor housing 40 accommodating the motor 41 lies horizontally at a position above the turntable 3 and the fence 6 since the longitudinal axis of the motor housing 40 as well as that of the motor 41 and the motor shaft 42 obliquely extends relative to the saw blade 36 by the angle of 45°.

The support bolt 17 is thereafter tightened so as to fix the support member 15 to the bracket 14.

The motor 41 is started to rotate the spindle 38 together with the saw blade 36. Thus, as the motor shaft 42 is rotated, the bevel gear 39 which is in engagement with the gear 42a of the motor shaft 42 is rotated, so that the saw blade 36 is rotated with the spindle 38. The operator thereafter pulls the miter saw unit 21 on his side, with the aid of the bearing cylinder 19a formed as the angular ball spline, so that the slide bar 18 is drawn toward the operator relative to the support member 15 In a rightward direction in FIG. 1. As the operator presses the miter saw unit 21 downwardly to pivot the miter saw unit 21 around the support shaft 30 of the hinge member 22 so as to move the miter saw unit 21 from its uppermost position to the lowermost position, the safety cover 48 is moved by the operational link 49 to uncover the exposed half of the saw blade 36 in response to movement of the miter saw unit 21. Consequently, the operation can be performed to cut a work which is placed on the turntable 3 and is fixed in position. Here, the movement of the slide bar 18 relative to the support member 15 is stopped through abutment of the stopper member 26 on the cover member 20. Further, the lowermost position of the miter saw unit 21 is determined by the stopper bolt 46 which abuts on the stopper member 47. When the miter saw unit 21 reaches the lowermost position, the lower part of the saw blade 36 extends downwardly from the plate 8 through the cut-out recess 7 formed therein. As for the motor housing 40 accommodating the motor 41, since the longitudinal axis of the motor housing 40 is inclined relative to the saw blade 36 by the angle of 45° as described above, the motor housing 40 lies horizontally above the turntable 3 and the fence 6 and is spaced therefrom, so that the motor housing 40 may not abut on the work to be cut.

When the operator pushes the miter saw unit 21 together with the hinge member 22 away from him while keeping the miter saw unit 21 at the lowermost position, the slide bar 18 is moved to return to the left in FIG. 1, so that the oblique cutting operation of the work can be performed.

When the operator releases the downward pressing force applied to the miter saw unit 21 after completion of the cutting operation, the miter saw unit 21 is returned to the uppermost position by the biasing force of the compression spring 45, and the safety cover 48 is also returned to cover the exposed half of the saw blade 36 in response to such a movement of the miter saw unit 21.

If the operator wishes to return the miter saw unit 21 from the above rightwardly inclined position to the vertical position, the operator moves the miter saw unit 21 to pivot in a reverse direction or the left side direction. When the miter saw unit 21 reaches the vertical position, the stopper portion 53b of the stopper lever 53 again abuts on the stopper bolt 51a of the first pair, so that the miter saw can be operated to vertically cut the work. At this stage, the stopper member 59 of the support member 15 is moved away from the stopper bolt 52a of the second pair and is positioned at a middle position between the stopper bolts 52a and 52b.

Figure 8:
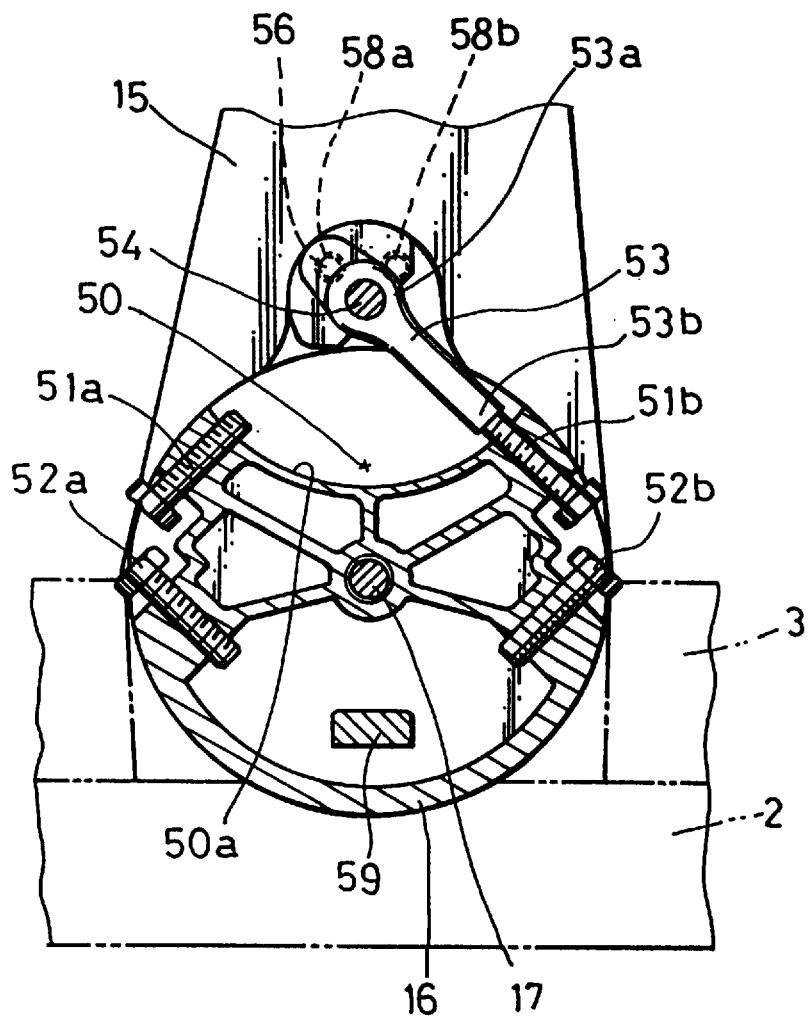
Figure 9:
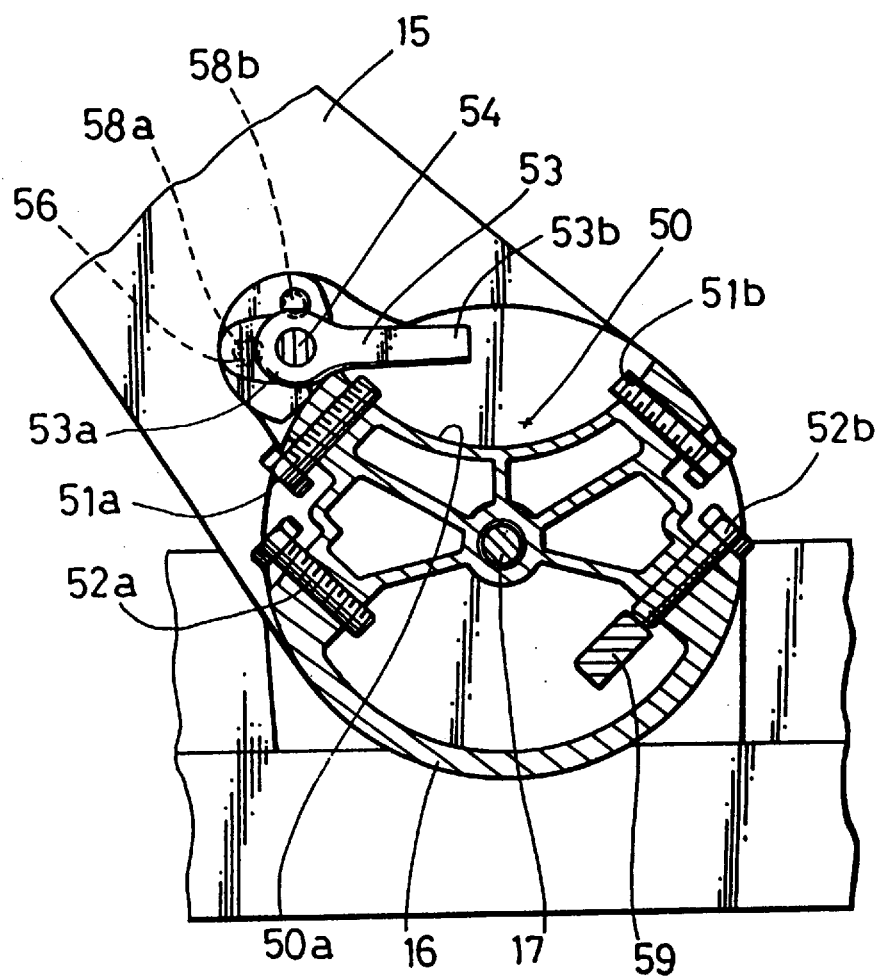

If the operator wishes to leftwardly incline the miter saw unit 21 from the vertical position, he moves the stopper lever 53 to the position for abutment on the stopper bolt 51b of the first pair as shown in FIG. 8. The operator thereafter loosens the support bolt 17 to permit movement of the support member 15 relative to the bracket 14. Then, the operator moves the miter saw unit 21 to pivot the support member 15 relative to the bracket 14 in a leftward direction in FIG. 2. When the saw blade 36 reaches a position inclined at the angle of 45° relative to the vertical plane, the stopper portion 53b of the stopper lever 53 is moved away from the right side stopper bolt 51b of the first pair and lies substantially horizontally, while the right side of the stopper member 59 of the support member 15 abuts on the right side stopper bolt 52b of the second pair as shown in FIG. 9. At this stage, the longitudinal axis of the motor housing 41 as well as that of the motor 40 extends vertically and the motor housing 41 is kept to be spaced from the turntable 3 and the fence 6.

The support bolt 17 is again tightened to fix the support member to the bracket 14, so that the oblique cutting operation on the opposite te side can be performed. Particularly, in this operation, an inked line drawn on the work can be easily recognized by the operator, so that the cutting operation can be reliably performed.

If the operator wishes to return the miter saw unit 21 from the leftwardly inclined position to the vertical position, the operator pivots the miter saw unit 21 in a reverse direction. When the miter saw unit 21 reaches the vertical position, the stopper portion 53b of the stopper lever 53 abuts on the left side stopper bolt 51a of the first pair, so that the vertical cutting operation can be again performed. At this stage, the stopper member 59 of the support member 15 is moved away from the right side stopper bolt 52b of the second pair and is positioned at the middle position between the stopper bolts 52a and 52b as shown in FIG. 8.

Meanwhile, the position of the stopper portion 53b of the stopper lever 53 is kept at either the positions for abutment on the first pair of the stopper bolts 51a and 51b through engagement of the engaging ball 56 with the corresponding engaging recess 58a or 58b.

As described above, the miter saw 1 of the above embodiment can be used for the oblique cutting operation by laterally inclining the miter saw unit 21 in either of leftward and rightward directions, and therefore, the oblique cutting operation for both opposite sides can be easily performed for a work having a deformed profile in section as well as a work having a longer length.

Although the operation has been described in connection with the cutting operation by moving the miter saw unit 21 in the horizontal direction, a normal cutting operation can be also performed by moving the miter saw unit 21 to simply pivot downwardly. Further, since each of the first pair of the stopper bolts 51a and 51b as well as each of the second pair of the stopper bolts 52a and 51b can be operated to change the position of the end portion, the inclined position of the saw blade 36 in both leftward and rightward directions as well as the vertical position can be easily adjusted and can be easily determined.

Additionally, the operation for fixing the support member 15 to the bracket 14 and for releasing the same can be performed at a position on the pivotal axis of the support member 15 through the support bolt 17 and the nut 17a. Therefore, the construction becomes simple and the fixing operation can be reliably performed without causing unstable support of the support member 15.

Further, with such a construction, cutting chips or dust may not enter the pivotal support portion of the support member 15, and the cutting chips or the dust may be stained to the stopper member 59 or the second pair of the stopper bolts 52a and 52b for abutment on the stopper member 59 since they are disposed within the support shaft 16 of the bracket 14.

(Second Embodiment)

A second embodiment of the present Invention will now be explained with reference to FIGS. 10 to 21.

Figure 10:
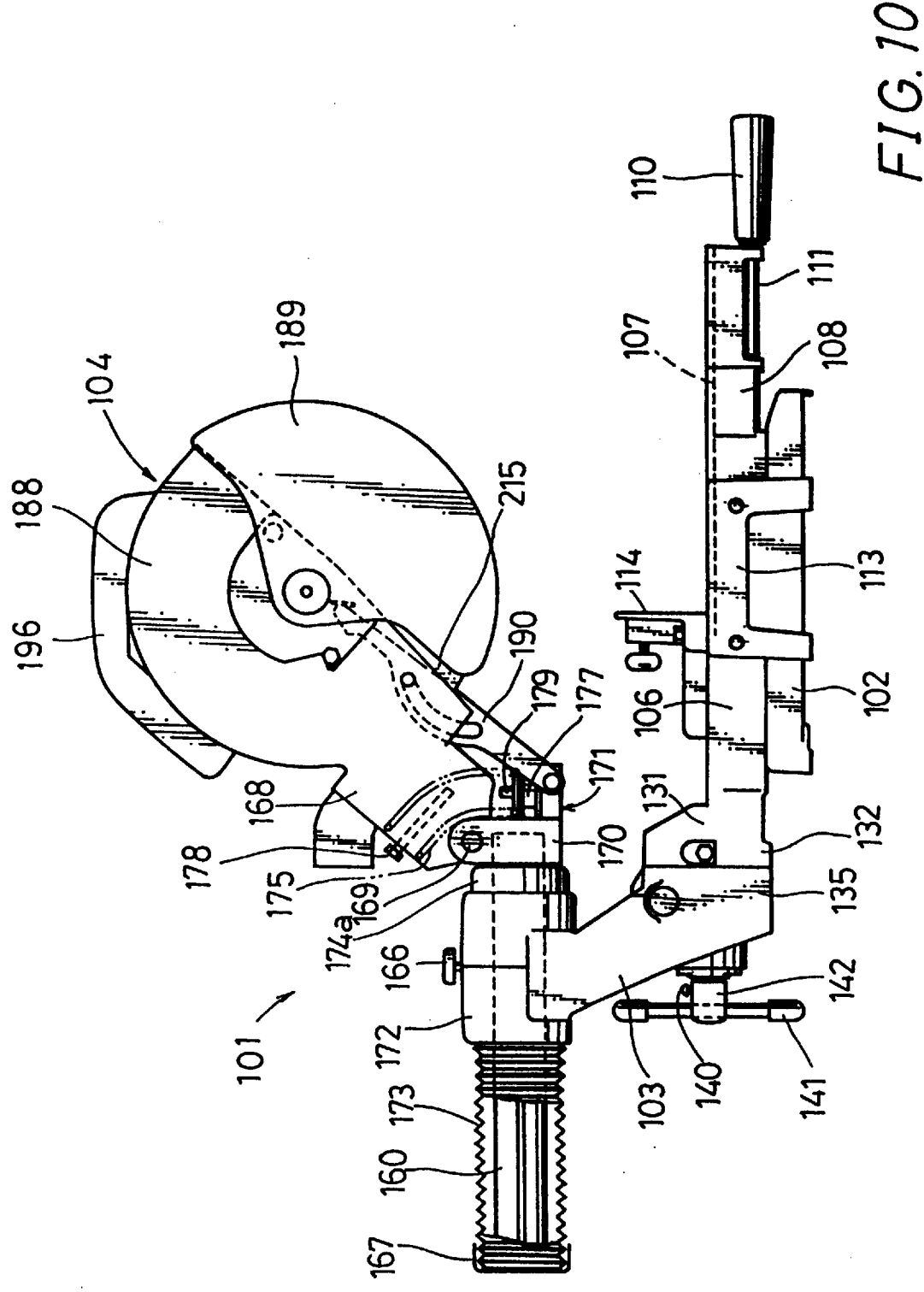
FIG. 10 is a side view of a miter saw according to a second embodiment of the present invention.
Figure 11:
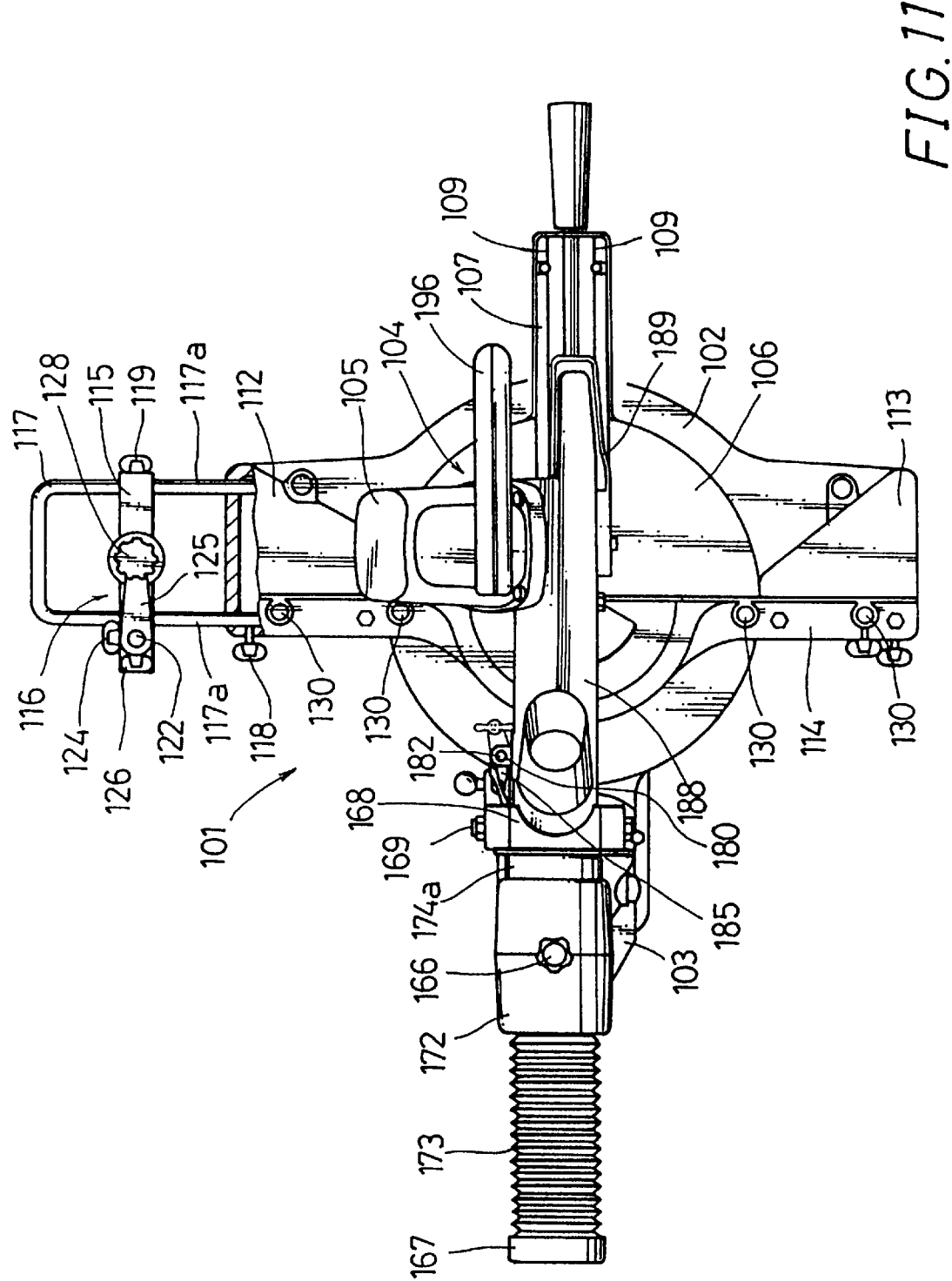
FIG. 11 is a plan view of FIG. 10.
Figure 12:
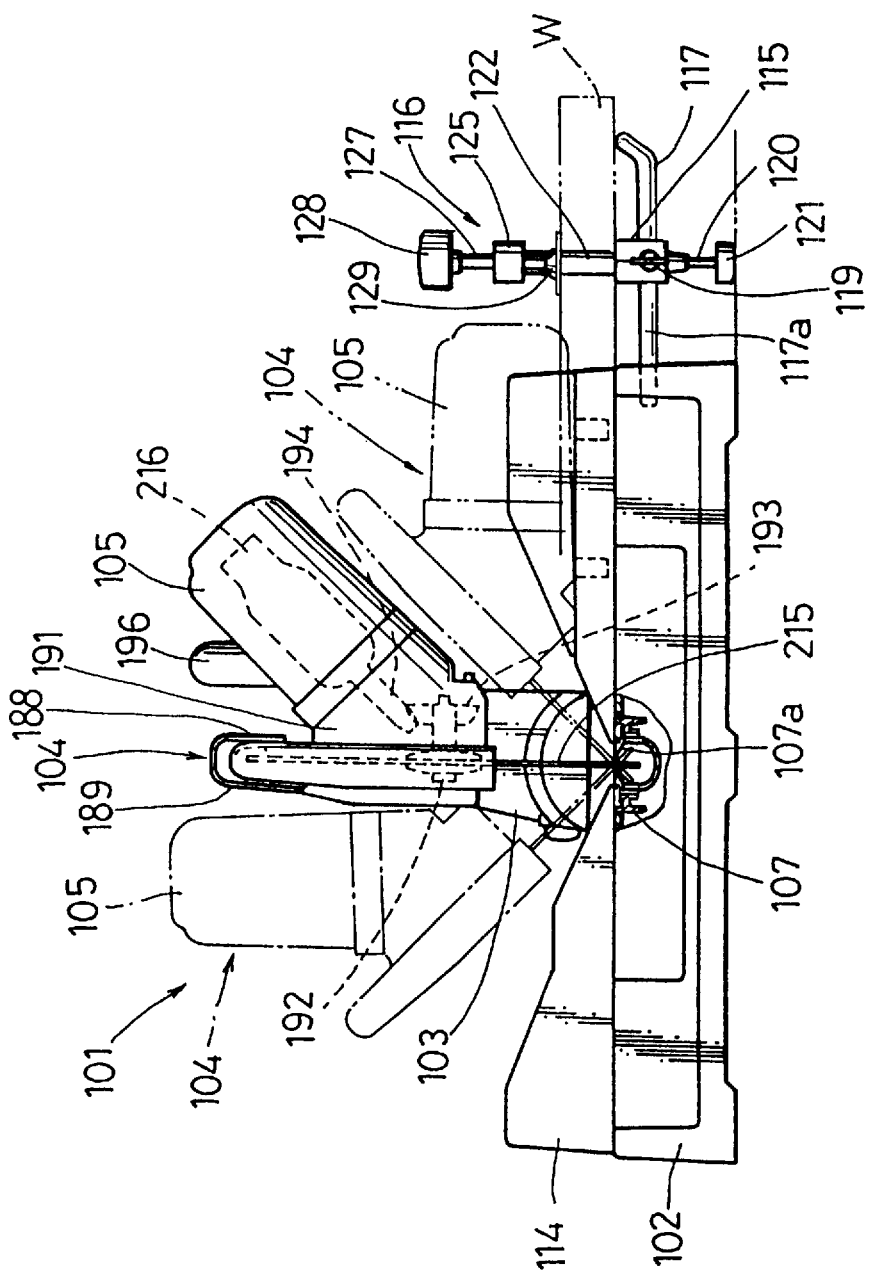
FIG. 12 is a front view, with a part broken away, of FIG. 10.

Referring to FIGS. 10 to 12, there is shown a side view, a plan view and a front view, respectively, of a miter saw 101 according to the second embodiment.

The miter saw 101 includes a base 102 on which a work is placed. A miter saw unit 104 supports a circular saw blade 215 and is vertically pivotally and laterally pivotally mounted on the base 102 through a support member 103. The miter saw unit 104 is Integrally formed with a motor housing 105 which accommodates a motor 116 for driving the saw blade 215. As with the first embodiment, the longitudinal axis of the motor 116 as well as that of the motor housing 105 is inclined relative to the saw blade by an angle of 45°, so that the motor housing 105 extends obliquely upwardly relative to the miter saw unit 104.

Figure 13:
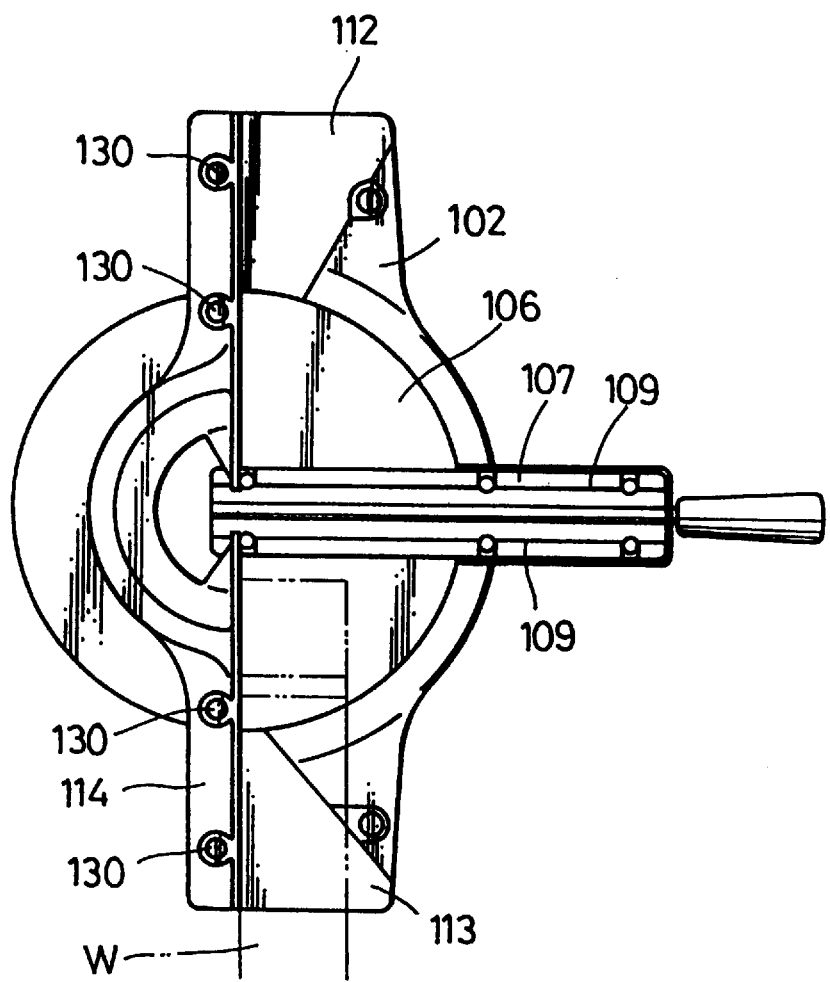
FIG. 13 is a plan view of a base including a turntable shown in FIG. 10.

A turntable 106 is mounted on the central portion of the base 102 and is rotatable within a horizontal plane relative to the base 102. The rotation of the turntable 106 is limited within a predetermined angle. The turntable 106 includes a plate 107 disposed in a diametrical direction of the turntable 106 and partly extends laterally outwardly therefrom. A protrusion 108 is formed on the turntable 106 so as to support the extended portion of the plate 107. As shown in FIG. 13, a plurality of parallel lines 109 are drawn on the plate 107 in the longitudinal direction thereof and are served as reference lines for positioning of an inked line drawn on the work. In the state shown in FIG. 13, a cut-out recess is not as yet formed on the plate 107.

An operational rod 111 is rotatably mounted on the lower part of the protrusion 108 and includes a grip 110 mounted on one end thereof. The grip 110 extends outwardly from the protrusion 108 for operation by an operator to turn the turntable 106. As the operator rotates the operational rod 111, the operational rod 111 is moved away from and toward a part of the outer wall of the base 102 by means of a thread mechanism (not shown) provided between the operational rod 111 and the protrusion 108, so that the turntable 106 can be fixed relative to the base 102 at any desired rotational position.

The base 102 includes a pair of work support tables 112 and 113 which are opposed to each other in a diametrical direction of the turntable 106 which is perpendicular to the longitudinal direction of the plate 107. The support tables 112 and 113 are disposed adjacent the peripheral portion of the turntable 106. The upper surfaces of the work support tables 112 and 113 are positioned in the same plane as the upper surface of the turntable 106 to form a work placing surface. A fence 114 extends between the work support tables 112 and 113 over the turntable 106 for abutment of the lateral surface of the work thereon.

As shown in FIG. 11, an adjustable holder 115 is additionally provided for supporting the work and is disposed at the outer end of the work support table 112 which is positioned on the same side as the motor housing 105 with respect to the miter saw unit 104. A vertical vice device 116 is provided for vertically clamping the work placed on the holder 115.

Figure 14:
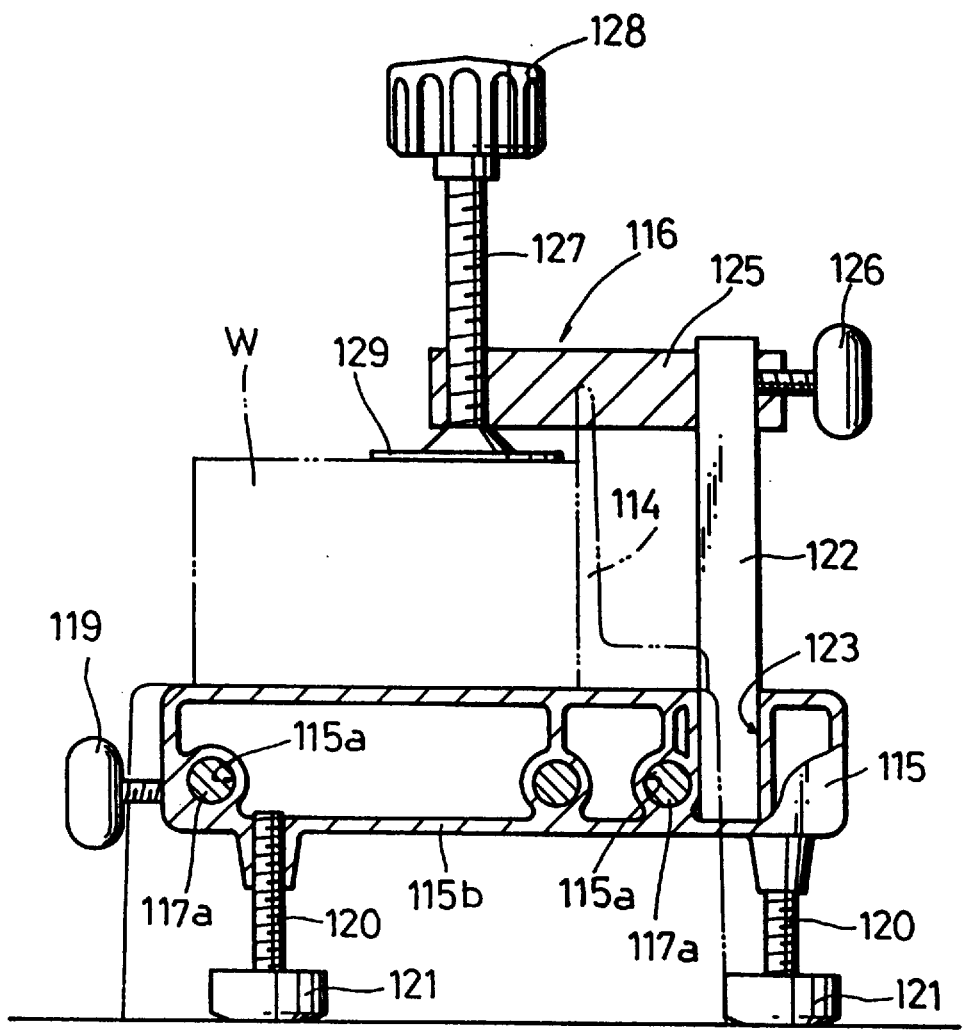
FIG. 14 is a sectional view of a holder and a vice device shown in FIG. 10.

The construction of the holder 115 and that of the vice device 116 will now be explained with reference to FIGS. 11, 12 and 14.

A substantially U-shaped guide member 117 is detachably mounted on the end portion of the work support base 112 through a thumbscrew 118 and includes a pair of parallel linear portions 117a which extend in a radial direction of the turntable 106. The holder 115 includes a pair of insertion holes 115a for receiving the linear portions 117a, respectively, so that the holder 115 is slidably movable along the linear portions 117a. A thumbscrew 119 is screwed into the forward portion of the holder 115 for fixing the position of the holder 115 relative to the linear portions 117a. A pair of vertical support legs 121 are mounted on the bottom 115b of the holder 115 and include threaded shaft portions 220 in engagement with the bottom 115b, respectively, so that the vertical position of the holder 115 can be adjusted.

The vice device 116 includes a vertical support shaft 122 which extends vertically upwardly from the rear portion of the holder 115. The lower part of the vertical support shaft 122 is inserted into a corresponding insertion hole 123 having a bottom end and formed on the rear portion of the holder 115. The vertical support shaft 122 is detachably fixed to the holder 115 through a thumbscrew 124. A horizontal support shaft 125 is detachably mounted on the upper end of the vertical support shaft 122 through a thumbscrew 126. The horizontal support shaft 125 includes one end extending to a position above substantially the central portion of the holder 115. A tightening screw 127 is vertically threadably engaged with the one end of the horizontal support shaft 126. The tightening screw 127 includes, at its upper end, a knob 128 for rotational operation by the operator. Further, the tightening screw 127 includes, at its lower end, an abutting member 129, for abutment on the upper surface of a work W shown by a dotted line. Thus, upon tightening of the tightening screw 127, the work W is pressed on the upper surface of the holder 115 through the abutting member 129.

Here, the vice device 116 can be used for holding the work on both lateral sides of the turntable 106 by inserting the vertical support shaft 122 into any of inserting holes 130 which correspond to the inserting hole 123 and which are formed on the fence 114, respectively.

Figure 15:
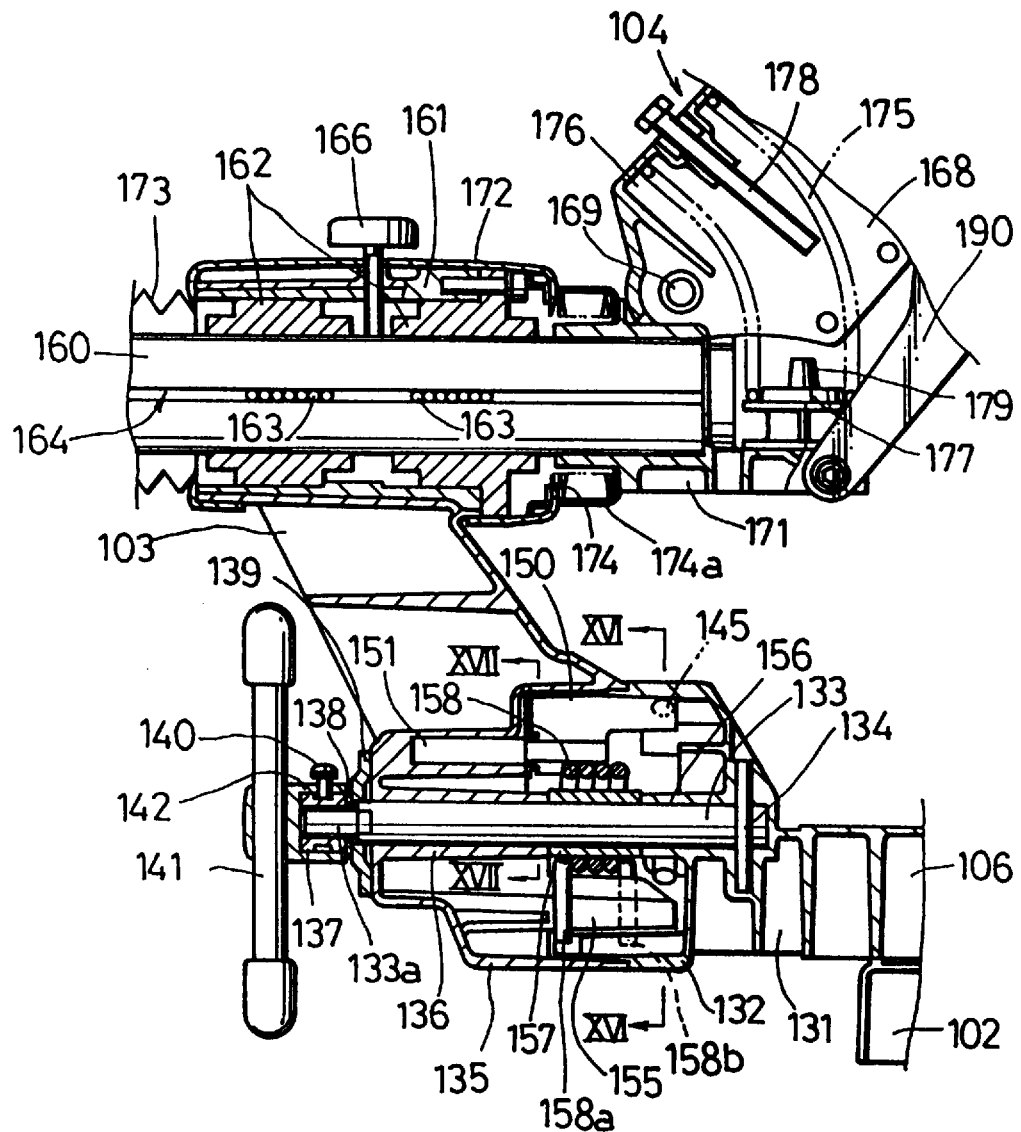
FIG. 15 is a vertical sectional view of a support member shown in FIG. 10.

As shown In FIGS. 10 and 15, the support member 103 is mounted on a bracket for supporting the miter saw unit 104 relative to the base 102. The bracket 131 is integrally formed with the rear end of the turntable 106 and is disposed on the opposite side of the protrusion 108 of the plate 107. The bracket 131 includes a substantially cylindrical support portion 132 which is opened at its rear end. A support shaft 133 is disposed centrally within the support portion 132 and extends rearwardly from the opened end of the support portion 132. The support shaft 133 is fixed to the support portion 132 not to rotate relative thereto through a pin 134. The support member 103 includes, at its lower portion, a cylindrical rotational portion 135 having a configuration corresponding to the support portion 132 and opened at its forward end. The opened forward end of the rotational portion 135 is rotatably fitted on the opened rear end of the support portion 132 in such a manner that the rotational axis of the rotational portion 135 is positioned in substantially the same plane as the upper surface of the base 102 and extends substantially in parallel with the longitudinal direction of the plate 107. The rear portion of the support shaft 133 extends outwardly from the rotational portion 135 through a sleeve 136 which is integrally formed with the rotational portion 135 and which is disposed therewithin. The outwardly extended end of the support shaft 133 includes a threaded portion 133a which is in engagement with a nut 137. A flat washer 138 and a spring washer 139 are interposed between the nut 137 and the rear end of the rotational portion 135. A turning handle 141 includes a handle shaft 142 which is secured to the nut 137 through a screw 140. Thus, as the handle 141 is turned to move the nut 137 forwardly, the spring washer 139 is pressed on the rear end of the rotational portion 135, so that the rotational portion 135 can be fixed in position relative to the support portion 132.

A mechanism is provided between the support portion 132 and the rotational portion 135 for determining the position of the rotational portion 135 relative to the support portion 132 or for determining the vertical position and leftwardly and rightwardly inclined positions of the miter saw unit 104. The construction of this mechanism will now be explained with reference to FIGS. 16 to 19.

Figure 16:
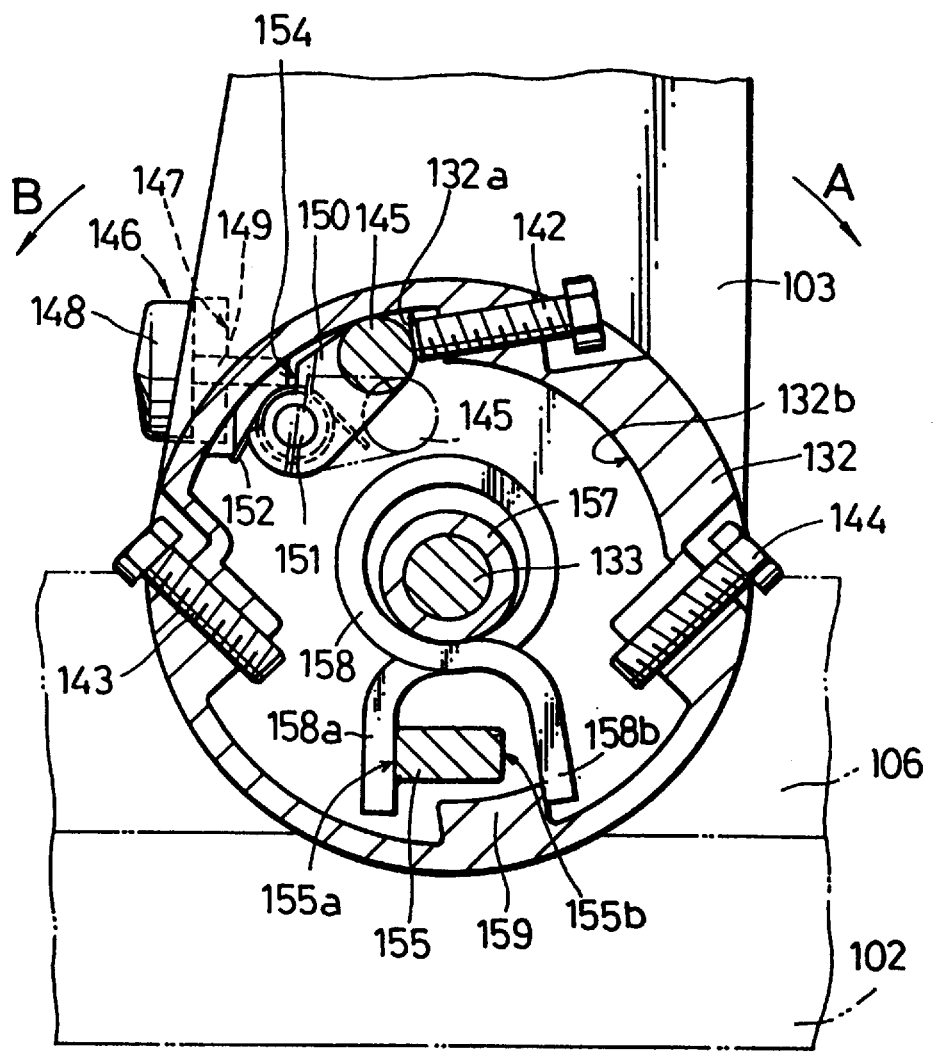
FIG. 16 is a sectional view taken along line XVI—XVI in FIG. 15.

Referring to FIG. 16 which is a sectional view taken along line XVI—XVI in FIG. 15, there is shown a first stopper bolt 142, a second stopper bolt 143 and a third stopper bolt 144 which are in engagement with the support portion 132 of the bracket 131. The first stopper bolt 142 is disposed substantially directly above the support shaft 133. The second and the third stopper bolts 143 and 144 are displaced from the first stopper bolt 142 by an angle of 45° in a counterclockwise direction (direction B) and a clockwise direction (direction A), respectively. The second and the third stopper bolts 143 and 144 are positioned at substantially the same level as the support shaft 33 when the support member 103 is positioned at the vertical position where the saw blade 215 of the miter saw unit 104 is positioned vertically relative to the base 102. Each of the first to third stopper bolts 142 to 144 has a head portion extending outwardly from the support portion 132 and an end portion extending inwardly of the support portion 132.

Figure 17:
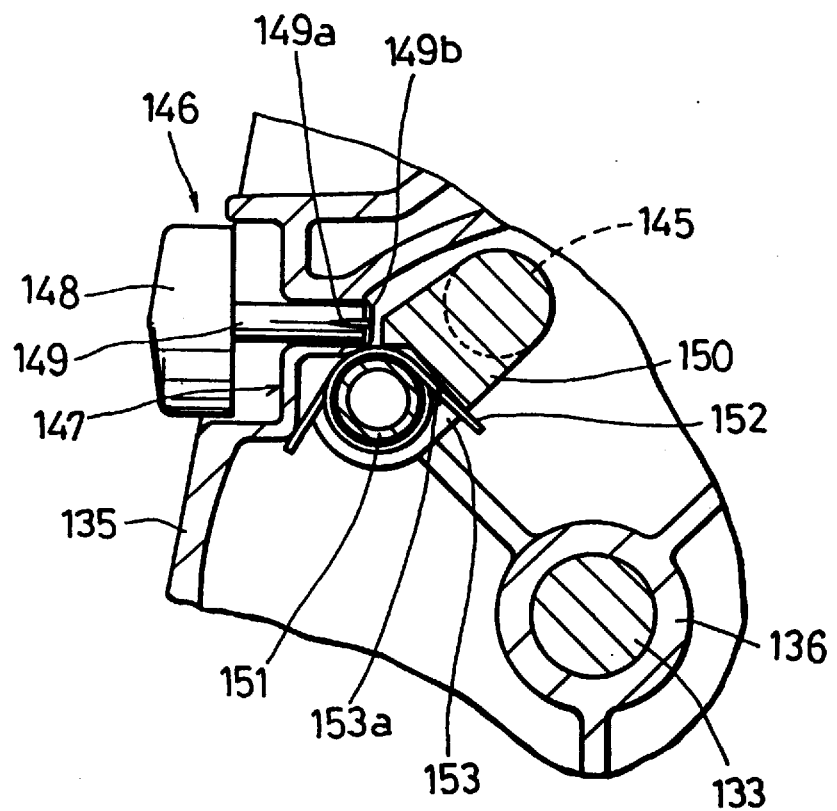
FIG. 17 is a sectional view taken along line XVII—XVII in FIG. 15.

A stopper mechanism 146 is mounted on the rotational portion 135 and includes a stopper pin 145 which abuts on the end portion of the first stopper bolt 142 when the support member 103 is positioned at the vertical position as shown in FIG. 16. The stopper mechanism 146 further includes an operational knob 148 which is operable by the operator and is received within a recess 147 formed on the outer wall of the rotational portion 135 as shown in FIG. 17, a sectional view taken along line XVII—XVII in FIG. 15. The operational knob 148 includes an operational shaft 149 having one end fixed to the operational knob 148 and having the other end inserted into the rotational portion 135 so as to extend to the inside thereof. The other end of the operational shaft 149 is enlarged by forming an axial slit 149a and includes, at its extremity, a peripheral collar 149b formed thereon, so that the operational shaft 149a is prevented from being removed from the rotational portion 135.

Further, as shown In FIG. 17, a lever 150 having one end to which the stopper pin 145 is fixed is disposed within the rotational portion 135 at a position adjacent the operational shaft 149 of the operational knob 148. The lever 150 is pivotally supported by a support pin 151 which is fixedly received by a corresponding inserting hole formed on the rotational portion 135 as shown in FIG. 15. A torsion coil spring 152 is fitted on the support pin 151 and has one end in abutment on the inner wall of a part of the rotational portion 135 which forms the recess 147. The other end of the torsion coil spring 152 is in abutment on a bottom surface 153a of an engaging recess 153 formed on the lever 150. The bottom surface 153a extends substantially vertically relative to a radial direction of the support pin 51, and the other end of the torsion coil spring 152 abuts on the end portion of the bottom surface 153a in the clockwise direction around the support pin 151 as shown in FIG. 17. Thus, the lever 150 is normally biased by the torsion coil spring 152 In the counterclockwise direction around the support pin 151, so that, in the state shown in FIG. 16, the stopper pin 145 abuts on an abutting surface 132a formed on the inner wall of the supporting portion 132 adjacent a mounting portion of the first stopper bolt 142 in the counterclockwise direction (direction A), and therefore, the stopper pin 145 is kept in opposed relationship with the end portion of the first stopper bolt 142.

Further, On the inner wall of the support portion 132, a guide surface 132b is formed between the mounting portion of the first stopper bolt 142 and that of the second stopper bolt 143. The guide surface 132b is continuous with the abutting surface 132a via a stepped portion in the clockwise direction and is positioned radially inwardly of the abutting surface 132a. The function of the guide surface 132b will be described later.

As described above, the motor housing 105 accommodating the motor 216 extends laterally obliquely relative to the miter saw unit 104, and therefore, in the state of the vertical position shown in FIG. 16, the gravity of the motor 216 as well as that of the motor housing 105 produces a moment to pivot the support member 103 in the clockwise direction (direction A). Thus, in the state shown in FIG. 16, the rotational portion 135 is forced by the moment applied to the support member 103 in the clockwise direction so as to bring the stopper pin 145 of the lever 150 to abut on the end portion of the first stopper bolt 42. Thus, the support member 103 is determined to be vertically positioned.

As shown in FIG. 16, the lever 150 includes an abutting surface 154 formed on the side opposed to the end portion of the operational shaft 149 of the operational knob 148. As the operator pushes the operational knob 148 into the recess 147, the end portion of the operational shaft 149 moves to abut on the abutting surface 154 of the lever 150, so that the lever 150 is pivoted against the biasing force of the torsion coil spring 152 in the clockwise direction around the support pin 151. Thus, the stopper pin 145 is positioned not to abut on the end portion of the first stopper bolt 142 as shown by dotted line in FIG. 16, and therefore, the support member 103 can be pivoted from the vertical position in the clockwise direction (direction A) in FIG. 16.

As shown in FIG. 15, a stopper member 155 is formed integrally with the rotational portion 135 and is disposed within the lower part thereof. The stopper member 155 extends into the support portion 132 and includes lateral surfaces 155a and 155b which are positioned on substantially the same circumferential line as that passing through the end portions of the second and the third stopper bolts 143 and 144. Thus, when the support member 103 is pivoted in the clockwise direction (direction A), the lateral surface 155a may abut on the end portion of the second stopper bolt 143. On the other hand, when the support member 103 is pivoted in the counterclockwise direction (direction B), the lateral surface 155b may abut on the end portion of the third stopper bolt 144. Consequently, the pivotal movement of the support member 103 can be limited to a determined angle for both leftward and rightward directions.

A torsion coil spring 158 is fitted on a cylindrical spacer 157 which is interposed between the sleeve 136 of the rotational member 135 and a sleeve 156 integrally formed with the support portion 132 for receiving the support shaft 133 (see FIG. 15). As shown in FIG. 16, end portions 158a and 158b of the torsion coil spring 158 intersect each other and are turned in J-shaped configurations in opposite directions to each other. The end portions 158a and 158b extend to a position adjacent the inner wall of the support portion 132 so as to receive the stopper member 155 therebetween. The inner wall of the support portion 132 includes an engaging protrusion 159 having substantially the same width as the stopper member 155. The engaging protrusion 159 is disposed between the second stopper bolt 143 and the third stopper bolt 144 at a position displaced by a short distance from the middle position toward the third stopper bolt 144. In the vertical state of the support member 103 shown in FIG. 16, the end portion 158a of the torsion coil spring 158 positioned on the side of the clockwise direction of the stopper member 155 abuts on the lateral surface 155a of the stopper member 155, while the end portion 158b abuts one lateral side of the engaging protrusion 159 positioned in the counterclockwise direction. Thus, the torsion coil spring 158 biases the rotational portion 135 in the counterclockwise direction (direction B) in FIG. 16 through the stopper member 155. This biasing force may counterbalance the moment produced by the motor 216 and the motor housing 105 in the direction A, so that the vertical position of the support member 103 can be maintained in stable condition. The moment produced by the biasing force of the torsion coil spring 158 is determined to be slightly smaller than the moment of the motor 216 and the motor housing 105 when the support member 103 is positioned at the vertical position. Further, the moment produced by the biasing force of the torsion spring 158 is determined to be slightly smaller than the moment of the whole miter saw unit 104 when the miter saw unit 104 or the support member 103 is at the laterally pivoted position.

When the rotational portion 135 is rotated in the direction B from the vertical position shown in FIG. 16 by an angle corresponding to the angular displacement between the stopper member 155 and the engaging protrusion 159, both end portions 158a and 158b are brought in abutment on their corresponding lateral surfaces 155a and 155b of the stopper member 155, respectively, so that no more biasing force is applied to the rotational portion 135. This rotational position of the rotational portion 135 corresponds to a neutral position where the center of gravity of the miter saw unit 104 including the support member 103 and the motor housing 105 is postitioned directly above the support shaft 33.

Figure 18:
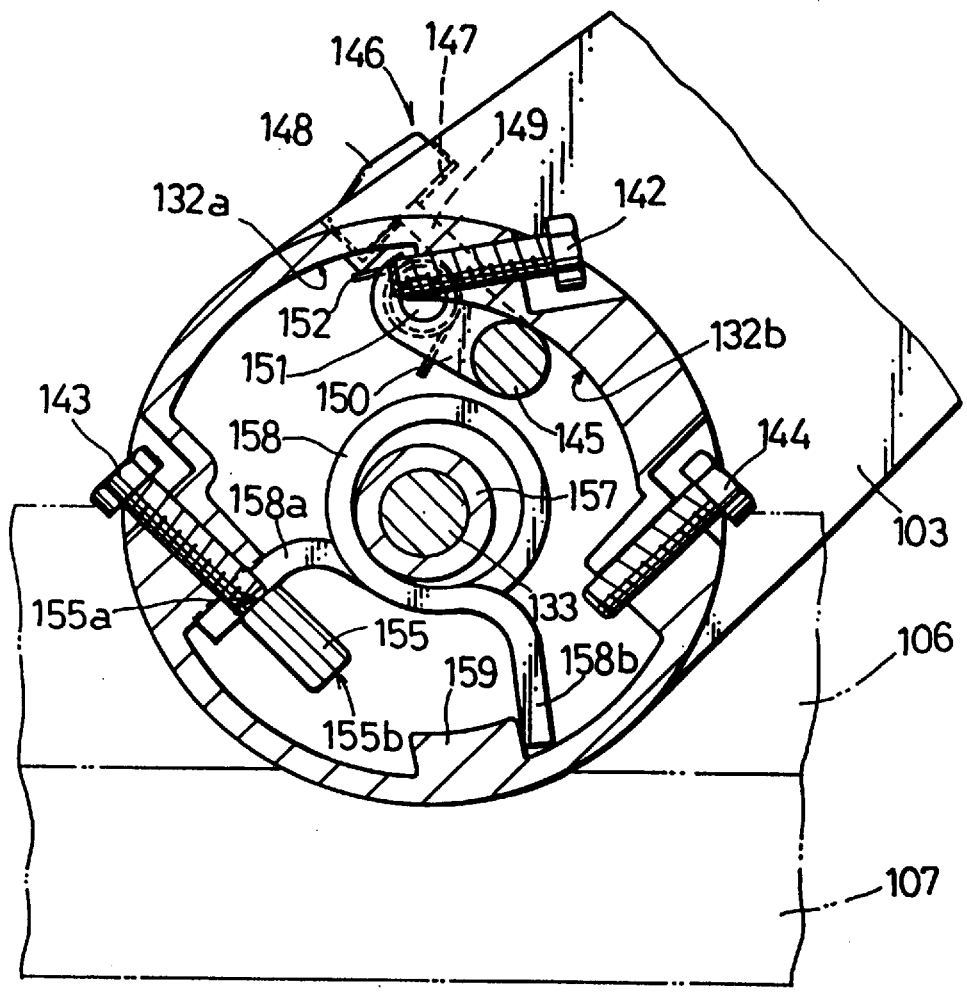
FIG. 18 is a view similar to FIG. 16 but showing the support member pivoted in the rightward direction.
Figure 19:
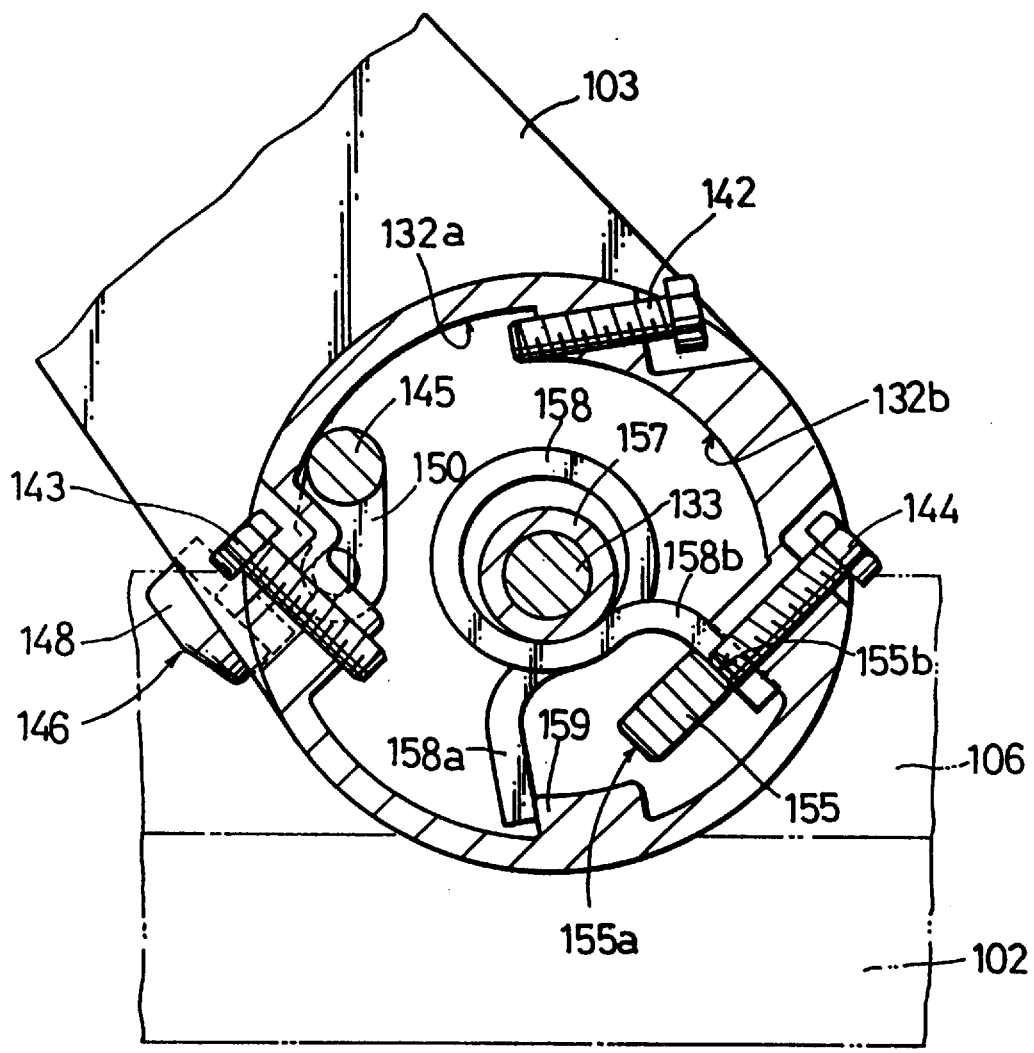
FIG. 19 is a view similar to FIG. 16 but showing the support member pivoted in the leftward direction.

As the support member 103 is pivoted laterally rightwardly from the state shown in FIG. 16 or the rotational portion 135 is rotated in the direction A, the distance between the end portions 158a and 158b of the torsion coil spring 158 increases as shown in FIG. 18. Therefore, the biasing force of the torsion coil spring 158 to return the miter saw unit 104 to the neutral position increases as the pivoted angle increases, so that the operation for laterally pivoting the support member 103 as well as the operation for returning the support member 103 to the vertical position can be easily and smoothly performed.

On the other hand, when the support member 103 is laterally leftwardly pivoted from the state shown in FIG. 16, or the rotational portion 135 is rotated in the direction B, the movement of the miter saw unit 164 can be smoothly performed with the aid of the biasing force of the torsion coil spring 158 in the same direction until the miter saw unit 104 reaches the neutral position. As the support member 103 is further pivoted, the distance between the end portions 158a and 158b increases with the end portion 158a in the clockwise direction engaged by the engaging protrusion and with the other end portion 158b in the counterclockwise direction engaged by the corresponding lateral surface 155b of the stopper member 155. Thus, the biasing force of the torsion spring 158 to return the miter saw unit 104 to the neutral position increases as the inclination angle Increases, so that the operation can be easily and smoothly performed as with the case of the rotation in the direction A.

Returning to FIG. 10, a slide bar 160 which supports the miter saw unit 104 is mounted on the upper portion of the support member 103. The slide bar 160 is horizontally slidably movable relative to the upper portion of the support member 103 in the forward and rearward directions. As shown in FIG. 15, a slide bar support cylinder 161 is integarally formed with the upper portion of the support member 103. A cylindrical bearing 162 is fixedly fitted within the support cylinder 161 and receives the slide bar 160 therewithin. The cylindrical bearing 162 is constructed as an angular ball spline as the first embodiment and includes a plurality of bearing balls 163 which are partly received within a pair of longitudinal recesses 164 formed on the outer surface of the slide bar 160 and diametrically opposed to each other and which are also partly received within a pair of corresponding recesses (not shown) formed on the inner surface of the cylindrical bearing 162. A bolt 166 is screwed into the upper part of the cylindrical bearing 162 and extends upwardly through a cover 172, so that the bolt 166 is operable to fix the position of the slide bar 160.

As shown in FIGS. 10 and 11, a cap 167 is mounted on the rear end of the slide bar 160. A bracket 171 is fixedly mounted on the forward end of the slide bar 160. The bracket 171 includes a forked hinge portion 170 which vertically pivotally supports a base portion 168 of the miter saw unit 104 through a support pin 169 (see FIG. 10).

The cover 172 serves to cover the upper portion of the support member 103 together with the cylindrical bearing 162. Portions of the slide bar 160 exposed to the outside between the cap 167 and the rear end of the cover 172 and between the forward end of the cover 172 and the bracket 171 are covered by bellows 173 and 174, respectively. The bellows 174 is further covered by an auxiliary cover 174a.

A compression spring 175 is interposed between the base portion 168 of the miter saw unit 104 and the bracket 171 at a position adjacent the support pin 169 or the fulcrum point of the miter saw unit 104, so that the compression spring 175 normally urges the miter saw unit 104 upwardly. The base portion 168 and the bracket 171 include spring supports 176 and 177 so as to receive the corresponding ends of the compression spring 175, respectively. A bolt 178 is screwed into the spring support 176 of the base portion 168 and extends substantially in the same direction as the pivotal direction. A stopper 179 is formed on the spring support 177 of the bracket 171 for abutment of the end portion of the bolt 178 thereon to limit the lower stroke end of the miter saw unit 104. The lower stroke end can be adjusted through rotation of the bolt 178.

Here, the lower stroke end determined by the bolt 178 and the stopper 179 is critical and is adjusted in consideration of the positional relationship between the saw blade 215 and the plate 107 when the saw blade 215 is lowered to intrude into the base 102 through the plate 107 for normal vertical cutting operation. However, in this embodiment, a mechanism is provided for adjusting the lower stroke end of the miter saw unit 104 to a different stroke end upwardly of the lower stroke end determined by the bolt 178 and the stopper 179 (hereinafter called "critical lower stroke end") according to cutting operations to be performed.

Figure 20:
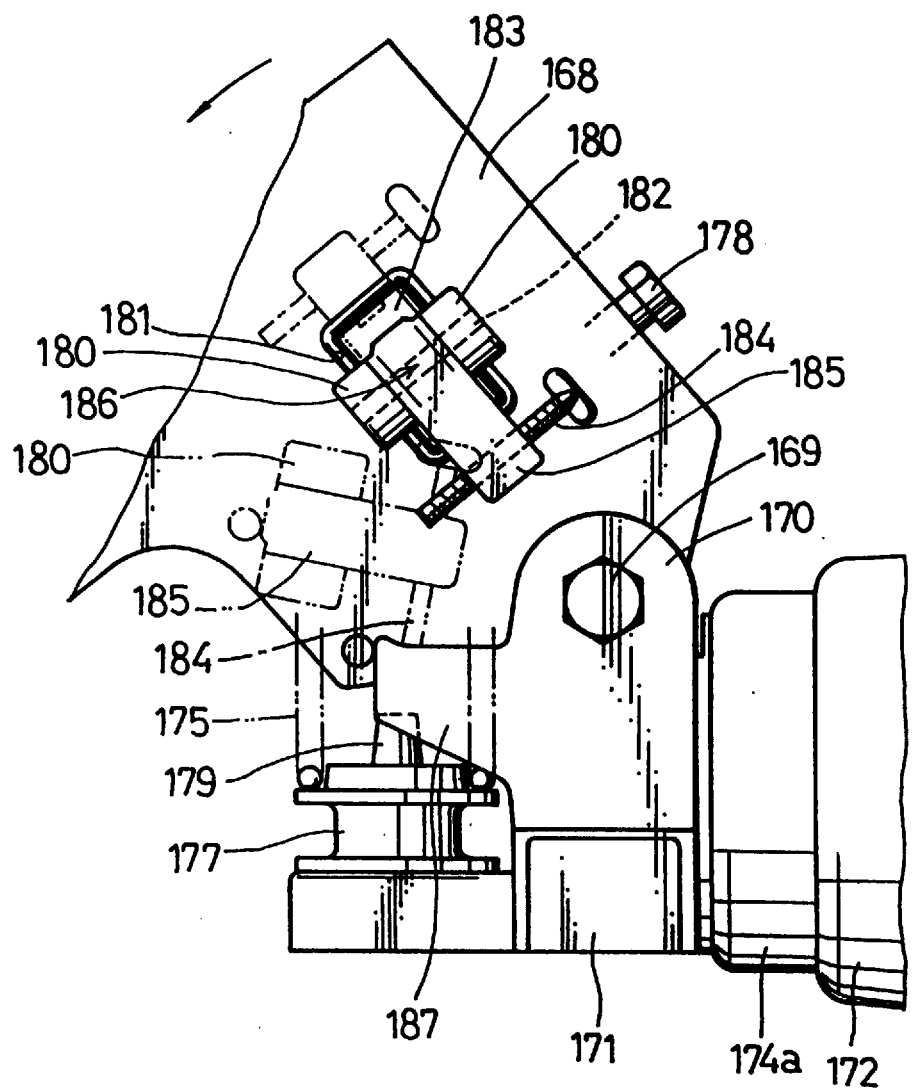
FIG. 20 is an enlarged view of a connecting portion between the support member and the miter saw unit shown in FIG. 10.

As shown in FIG. 20, a rectangular recess 181 is formed on the right side surface of the base portion 168. A spring plate 183 is disposed within the recess 181 and has a central portion to be resiliently deformed. A pair of protrusions 180 are formed on the base portion 168 at both sides of the recess 181 In the longitudinal direction. A pin 182 is mounted on the protrusions 180 and estends therebetween. An arm 185 has one end pivotally connected to the pin 182 and has the other end into which an adjusting bolt 84 screwed. The one end of the arm 185 connected to the pin 182 includes a pair of flat surfaces 186 (one shown in FIG. 20) disposed on both sides of the arm 185 and extending in parallel with the longitudinal direction of the arm 185. The flat surfaces 186 are opposed to each other in a diametrical direction of the pin 182 for abutment on the central portion of the spring plate 183. Through abutment on the spring plate 183, the position of the arm 185 is selectively kept at a first position and a second position where the adjusting bolt 184 is positioned on the side of the support pin 169 with respect to the pin 182 and is positioned on the side away from the support pin 169, respectively. On the other hand, an engaging projection 187 is integrally formed with the hinge portion 170 of the bracket 171 and is positioned for abutment of the lower end of the adjusting bolt 184 thereon when the arm 185 is at the first position and the miter saw unit 104 is vertically downwardly pivoted.

With this construction, when the arm 185 is at the first position, the lower stroke end of the miter saw unit 104 can be determined upwardly of the critical lower stroke end, and such stroke end can be adjusted through the adjusting bolt 184. On the other hand, when the arm 185 is pivoted from the first position to the second position, the adjusting bolt 184 may not abut on the engaging projection 187, so that the miter saw unit 104 can reach the critical lower stroke end.

The construction of the miter saw unit 104 is substantially the same as that of the first embodiment. As shown in FIGS. 10 to 12, the miter saw unit 104 includes a blade case 188 which accommodates the saw blade 215 to cover substantially the upper half thereof. The base portion 168 is integrally formed with the lower portion of the blade case 188. A safety cover 189 is rotatably mounted on the blade case 188 around the rotational axis of the saw blade 215 to cover the lower half of the saw blade 215. The safety cover 189 is interlocked with an operational link 190 pivotally supported by the bracket 171 of the slide bar 160 in such a manner that the safety cover 189 is rotated to uncover the lower half of the saw blade 215 as the miter saw unit 104 is pivoted downwardly.

As shown in FIG. 12, a gear housing 191 is Integrally formed with the blade case 188 on the right side thereof. A spindle 192 on which the saw blade 215 is mounted is supported within the gear housing 191. A bevel gear 193 as a reduction gear is mounted on the spindle 192. The motor housing 105 is integrally formed with the gear housing 191 and extends oblique upwardly relative to the blade case 188. The motor 216 disposed within the motor housing 105 has a motor shaft 194 which extends obliquely upwardly relative to the saw blade 215 at an angle of 45° and includes an end portion having a gear in engagement with the bevel gear 193. As shown in FIG. 11, a handle 196 operable by the operator for pivotal movement of the miter saw unit 104 is integrally formed with the upper portion of the motor housing 105 and extends forwardly of the motor housing 105.

The operation of the second embodiment will now be explained. As the operator pivots the miter saw unit 4 vertically downwardly through the handle 196, the safety cover 189 is rotated to uncover the saw blade 215, so that an operation can be performed to cut a work placed on the base 102. As with the first embodiment, such a cutting operation may include a normal vertical cutting operation with the saw blade 215 maintained to be vertical relative to the base 102, and may include an oblique cutting operation with the saw blade 215 inclined leftwardly or rightwardly relative to the vertical position.

For the normal vertical cutting operation, the rotational portion 135 of the support member 103 is kept at the vertical position shown in FIG. 16 relative to the support portion 132 of the bracket 131 which is integral with the turntable 106. The vertical position is determined through abutment of the stopper pin 145 of the lever 150 of the stopper mechanism 146 on the end portion of the first stopper bolt 142 and is fixed through tightening of the nut 137 by the handle 141. Through adjustment of the driving amount of the first stopper bolt 142, the vertical position can be properly determined.

At this stage, the work (assuming as an elongated one) is placed on the base 102 to extend over both the work support tables 112 and 113, and the lateral position of the work is determined through abutment on the fence 114. On the other hand, the vertical vice device 116 is mounted on the fence 114 by utilizing appropriate one of the inserting holes 130, and the tightening screw 127 is tightened to fix the work in position.

Subsequently, the operator presses the miter saw unit 104 downwardly through the handle 196 against the biasing force of the compression spring 175 so as to pivot the miter saw unit 104 downwardly around the support pin 169. As the miter saw unit 104 is thus pivoted, the safety cover 189 is rotated to uncover the saw blade 215. When the saw blade 215 reaches the work, the lower half of the saw blade 215 is completely uncovered to cut the work. The miter saw unit 104 is further pivoted downwardly to reach the critical lower stroke end which is determined through abutment of the end portion of the bolt 178 of the base portion 168 on the stopper portion 179 of the bracket 171. (The arm 185 of the adjusting mechanism disposed on the right side of the base portion 168 is normally kept at the second position shown in the dotted line in FIG. 20.) At this stage, the lower part of the saw blade 215 Intrudes into the base 2 through the plate 107 as shown in FIG. 12.

If it is desired to change the lower stroke end of the miter saw unit 104 to a position upwardly of the critical stroke end according to change of kind of cutting operation, or if it is desired to change the most lowered position of the saw blade 215 to a position upwardly of the plate 107, the operator pivots the arm 185 from the second position to the first position shown by the solid line in FIG. 20 against the resilient force of the spring plate 183, so that the adjusting bolt 184 may abut on the engaging projection 187 to prevent further downward movement of the miter saw unit 104 before the miter saw unit 104 reaches the critical lower stroke end. Further, the lower stroke end determined by the adjusting bolt 184 can be changed by adjusting the screwing position relative to the arm 185. If it is desired to lower the miter saw unit 104 to again reach the critical lower stroke end, the operator pivots the arm 185 from the first position to the second position against the resilient force of the spring plate 183. When the arm 185 reaches the second position, the arm 185 is kept at this position by the resilient force of the spring plate 183, so that the adjusting bolt 184 may not abut on the engaging projection 187.

The miter saw unit 104 is mounted on the slide bar 160 supported by the upper portion of the support member 103, and the slide bar 160 is slidable in the forward and rearward directions relative to the support cylinder 161 of the upper portion of the support member 103. Therefore, when the operator loosens the fixing bolt 166 to permit movement of the slide bar 160 relative to the support member 103, and pulls the miter saw unit 104 forwardly with the handle 196 grasped by his hand, the miter saw unit 104 is moved forwardly through sliding movement of slide bar 160 along the support cylinder 161. Therefore, it becomes possible to cut a work throughout its width by the forward movement of the saw blade 215 even if the work has a wide width.

The oblique cutting operation with the saw blade 215 pivoted laterally relative to the vertical position will now be explained. To change the miter saw unit 104 from the vertical position to the laterally pivoted position or laterally inclined position, the operator turns the handle 141 to loosen the nut 137 so as to permit rotation of the rotational portion 135 relative to the support portion 132. Then, the operator pushes the operational knob 148 of the stopper mechanism 146 into the recess 147, resulting in that the stopper pin 145 is moved radially inwardly of the support portion 132 not to abut on the end portion of the first stopper bolt 142. As described above, at the state of FIG. 16 which corresponds to the vertical position of the miter saw unit 104, the moment in the clockwise direction (direction A) is applied to the support member 103 because of positioning of the motor housing 105 on the right side of the miter saw unit 104. Since such moment is greater than the moment applied by the biasing force of the torsion coil spring 158 in the reverse direction (direction B), the support member 103 is automatically laterally pivoted in the direction A when the stopper pin 145 is released. If such lateral pivotal movement has been once started, the operator may release the pushing force applied to the stopper pin 145 through the operational knob 148. Thus, when the pushing force has been released, the stopper pin 145 tends to return to its original position by the biasing force of the torsion coil spring 152. However, at this stage, the stopper pin 145 has been rotated to some extent together with the rotational portion 135 in the clockwise direction and has been moved to reach the guide surface 132b of the support portion 132 over the stepped portion formed on the mounting portion of the first stopper bolt 142. Therefore, the support member 103 can be further pivoted laterally without being prevented by the stopper pin 145.

The above pivotal movement is performed with the handle 196 of the miter saw unit 104 being held by the operator, and a smaller force is required to the operator to hold the miter saw unit 104 since the biasing force of the torsion coil spring 158 is applied in the direction opposite to the pivotal movement and increases as the pivoted angle increases.

The pivotal movement of the support member 103 is stopped through abutment of the stopper member 155 of the rotational portion 135 on the second stopper bolt 143 when the pivoted angle reaches an angle of 45°. Then, the operator turns the handle 141 to tighten the nut 137, so that the rotational portion 135 is fixed in position relative to the support portion 132. Thus, the support member 103 is kept at the pivoted position. The pivoted angle can be appropriately adjusted as desired through adjustment of the screwing position of the second stopper bolt 143.

With the support member 103 thus maintained at the laterally pivoted position, the operator can perform the oblique cutting operation of the work by pressing the miter saw unit 104 downwardly against the biasing force of the compression spring 175 through the handle 196. The lower part of the saw blade 215 extends downwardly from the plate 107 by substantially the same distance as the vertical cutting operation as shown in FIG. 12 when the miter saw unit 104 reaches the critical lower stroke end determined by abutment of the bolt 178 of the base portion 168 on the stopper portion 179 of the bracket 171.

Since the motor housing 105 extends rightwardly of the miter saw unit 104 and since the fence 114 having the insertion holes 130 for mounting the vice device 116 thereon is disposed on the same side as the direction of extension of the motor housing 105, there will be some possibility that the vice device 116 cannot be used for fixing the work because of the presence of the motor housing 105 when the support member 104 is at the rightwardly pivoted position. However, with this embodiment, the holder 115 is mounted on the end portion of the work support table 112 disposed on the right side, and the position of the holder 115 is adjustable along the guide member 117. The vice device 116 can be mounted on the holder 115 to fixedly press a work W against the holder 115 by tightening the tightening screw 127 as shown in FIGS. 12 and 14. The position of the holder 115 is adjustable relative to the guide member 117 according to the length of the work W. Further, since the guide member 117 is detachably mounted on the work support table 112, the guide member 117 can be removed from the work support table 112 if it is not required, so that an improved operability is obtained.

Another oblique cutting operation performed by pivoting the support member 103 from the vertical position in the leftward direction or the opposite direction of the above oblique cutting operation will now be explained. Firstly, the operator turns the handle 141 so as to release the rotational portion 135 from the support portion 132 in the same manner as the above cutting operation. Then, the operator pushes the miter saw unit 104 leftwardly or pivots the support member 103 in the counterclockwise direction (direction B) in FIG. 16 through the handle 196 while the stopper mechanism 146 is kept in position. Although, as described above, the moment of the miter saw unit 104 in the clockwise direction (direction A) is applied to the support member 103 at the vertical position shown in FIG. 16, substantial part of such moment is counterbalanced by the biasing force of the torsion coil spring 158 in the opposite direction. Therefore, a smaller force is required for the operator to pivot the support member 103. Further, after starting the pivotally movement, the gravity center of the miter saw unit 104 including the support member 103 as well as the motor housing 105 soon reaches the position directly above the support shaft 133 of the support portion 132, or the miter saw unit 104 soon reaches the neutral position. When the miter saw unit 104 further pivots from the neutral position, the moment of the miter saw unit 104 including the support member 103 is converted to be applied in the counterclockwise direction (direction B) or the pivoting direction. At the same time therewith, the torsion coil spring 158 applies the force in the opposite direction of the pivoting direction and the force of the torsion coil spring 158 increases as the pivoted angle increases. Therefore, because of the such biasing force of the torsion coil spring 158, during the pivotal operation, a smaller force is required for the operator to support the miter saw unit 104 through the handle 196 as is the case of the rightward pivotal operation. On the other hand, during the pivotal movement of the support member 103, the stopper pin 145 of the stopper mechanism 146 slidably moves along the abutting surface 132a of the support portion 132.

The pivotal movement of the support member 103 is stopped through abutment of the stopper member 155 of the rotational portion 135 on the third stopper bolt 144 when the support member 103 has been pivoted by an angle of 45°. Then, the operator turns the handle 141 to tighten the nut 137, so that the rotational portion 135 is fixed In position relative to the support portion 132. Thus, the support member 104 is maintained at the leftwardly pivoted position, and the oblique cutting operation can be performed by pressing the handle 196 of the miter saw unit 104 downwardly against the biasing force of the compression spring 175. The pivoted angle can be appropriately determined by adjusting the screwing position of the third stopper bolt 144 as is the case of the rightward pivoting operation, and the lower part of the saw blade 215 extends into the base 102 from the plate 107 by substantially the same distance as that of the vertical cutting operation when the miter saw unit 104 reaches the critical lower stroke end.

With the miter saw 101 of this embodiment, as described in connection with FIG. 13, a plurality of parallel lines 109 are drawn on the plate 107 in the longitudinal direction thereof. As for the miter saw 101 of the type as described above, the cut-out recess 107a is not formed on the plate 107 at the first time but is formed at the working place by cutting the plate 107 by the saw blade 215 through vertical cutting operation with the support member 103 positioned vertically relative to the base 102. For the cutting operation of the work, the positioning of the work relative to the base 102 is then performed with reference to the cut-out recess 107a thus formed in such a manner that the inked line drawn which may be drawn on the work is positioned to correspond to the position of the saw blade 215. However, the cut-out recess 107a becomes to have a broader width by the oblique cutting operation with the support member 103 laterally pivoted relative to the vertical position. Therefore, it becomes difficult to position the work in such a manner that the Inked line correctly corresponds to the cutting position by the saw blade 215 with reference to such broadened cut-out recess 107a. In this embodiment, the lines 109 are previously drawn on the plate 107, and therefore, the work can be positioned in such a manner that the inked line exactly corresponds to the cutting position by the saw blade 215 with reference to either of the lines 109 if the operator calculates the distance between the lines 109 and the cutting position by the saw blade 215 when the cut-out recess 107a is formed at the first time.

(Third Embodiment)

A third embodiment of the present invention will now be explained with reference to FIGS. 21 to 25. The construction of the third embodiment is the same as the second embodiment excepting the mechanism for determining the pivotal position of the rotational portion 135 of the support member 103 relative to the support portion 132 of the bracket 131 of the turntable 106. Therefore, drawings or an explanation for the construction other than that concerned with the mechanism for determining the pivotal position are omitted. Further, in FIGS. 19 to 25, the same parts as the second embodiment are labeled by the same numeral as the second embodiment and an explanation of the same parts are omitted.

Figure 21:
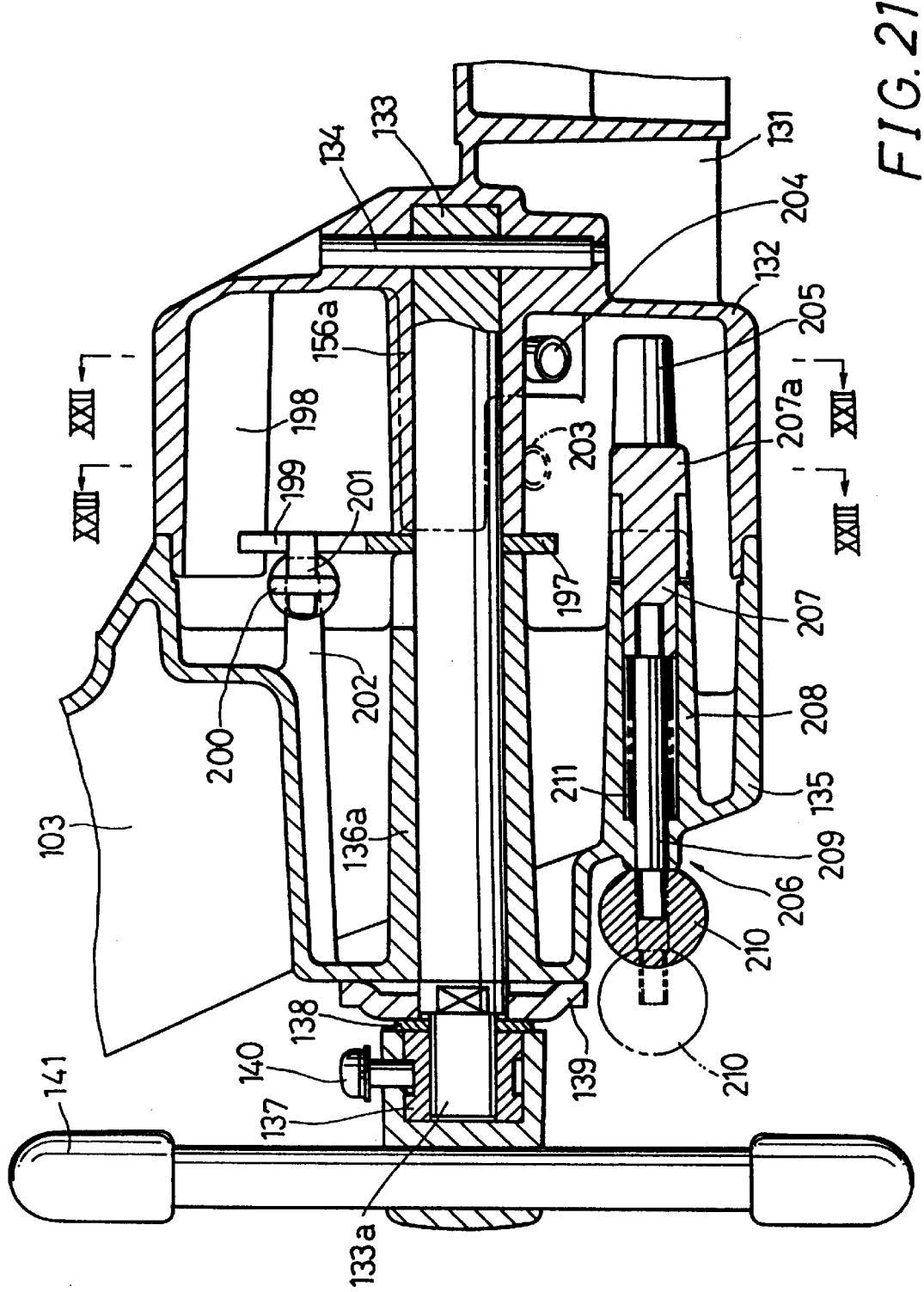
FIG. 21 is sectional view of a connecting portion of a support member and a base of a miter saw according to a third embodiment of the present invention.
Figure 22:
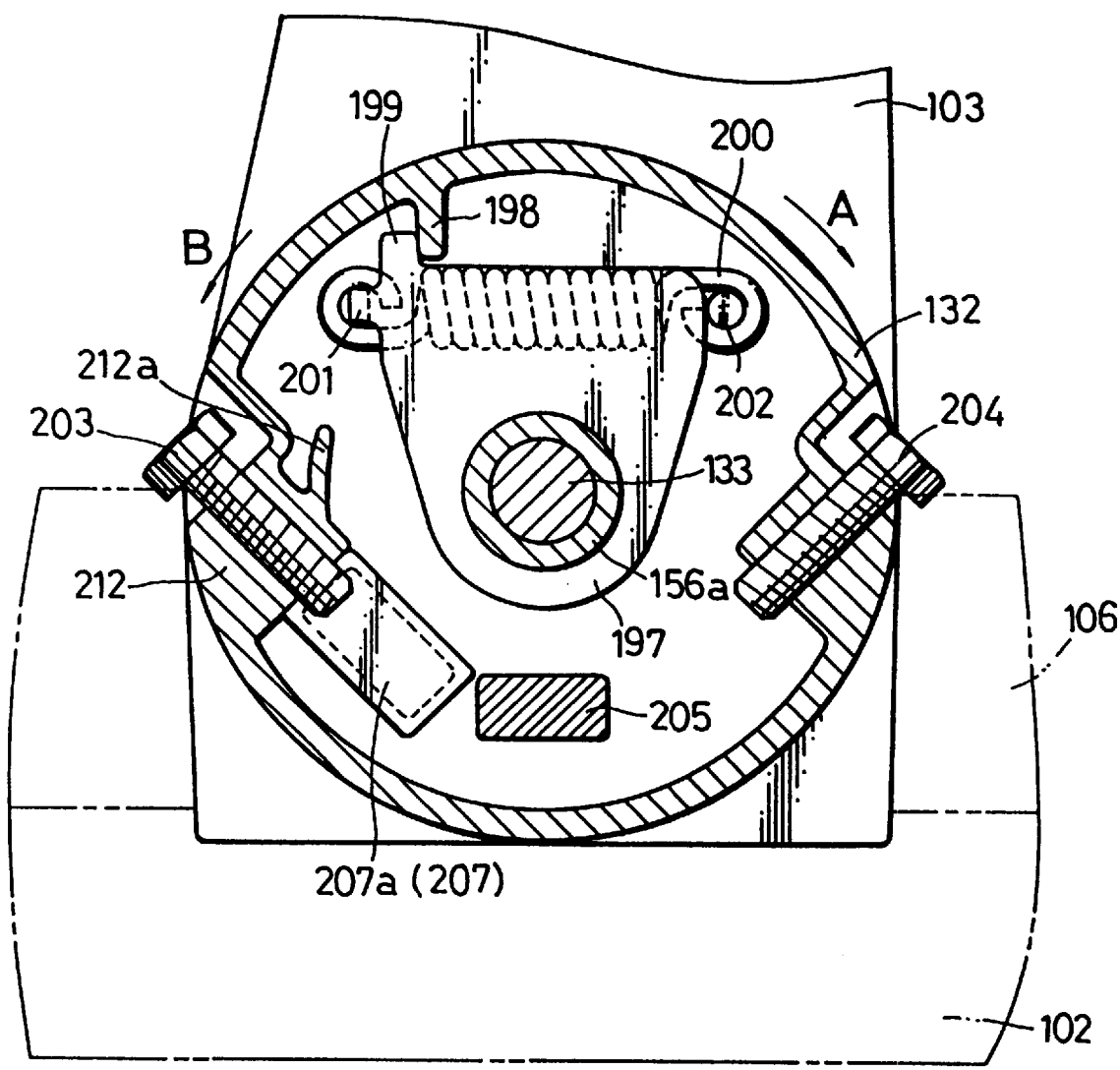
FIG. 22 is a sectional view taken along line XXII—XXII in FIG. 21.

Referring to FIG. 21, a substantially fan-shaped lever 197 is pivotally supported by the support shaft 133 at a position between the sleeve 136a of the rotational portion 135 and the sleeve 156a of the support portion 132. As shown in FIG. 21, an engaging portion 199 is integrally formed with the outer end of the lever 197 in the counterclockwise direction (direction B) and extends substantially radially therefrom. An engaging projection 198 is integrally formed with the inner wall of the support portion 132 and protrudes substantially vertically downwardly therefrom for engagement with the engaging portion 199. A hook portion 201 is integrally formed with the lateral side of the lever 197 in the circumferential direction and is disposed adjacent the engaging portion 199. The hook portion 201 is bent in the axial direction of the support portion 132 for engaging one end of a tension coil spring 200. A hook shaft 202 is integrally formed with the rotational portion 135 for engaging the other end of the tension coil spring 200 and extends in the axial direction toward the support portion 132. As shown in FIG. 21, the hook shaft 202 is positioned on the same level as the hook portion 201 of the lever 197 when the support member 103 is at the vertical position. Further, at the vertical position, the tension coil spring 200 biases the support portion 132 in the counterclockwise direction (direction B) in FIGS. 21 and 22 or the direction opposite to the moment in the clockwise direction (direction A) applied by the miter saw unit 104. When the support member 103 further pivoted by a small angle in the counterclockwise direction (direction B) to reach the neutral position where the gravity center of the miter saw unit 104 including the support member 103 is positioned directly above the support shaft 133, the biasing force of the tension coil spring 200 is no more applied to the support portion 132 as the case of the second embodiment.

A left stopper bolt 203 and a right stopper bolt 204 corresponding to the second stopper bolt 143 and the third stopper bolt 144 of the second embodiment, respectively, are screwed into the support portion 132. As shown in FIG. 21, the left stopper bolt 203 is displaced in the axial direction toward the rotational portion 135 relative to the right stopper bolt 204. A stopper member 205 corresponding to the stopper member 155 of the second embodiment is integrally formed within the lower part of the rotational portion 135 and extends into the support portion 132. The stopper member 205 performs the same function as the stopper member 155 to determine the laterally pivoted position through abutment on either of the end portions of the left stopper bolt 203 and the right stopper bolt 204.

In this third embodiment, a stopper mechanism 206 utilizing the left stopper bolt 203 is provided for determining the vertical position of the support member 103. The stopper mechanism 206 will now be described.

Figure 23:
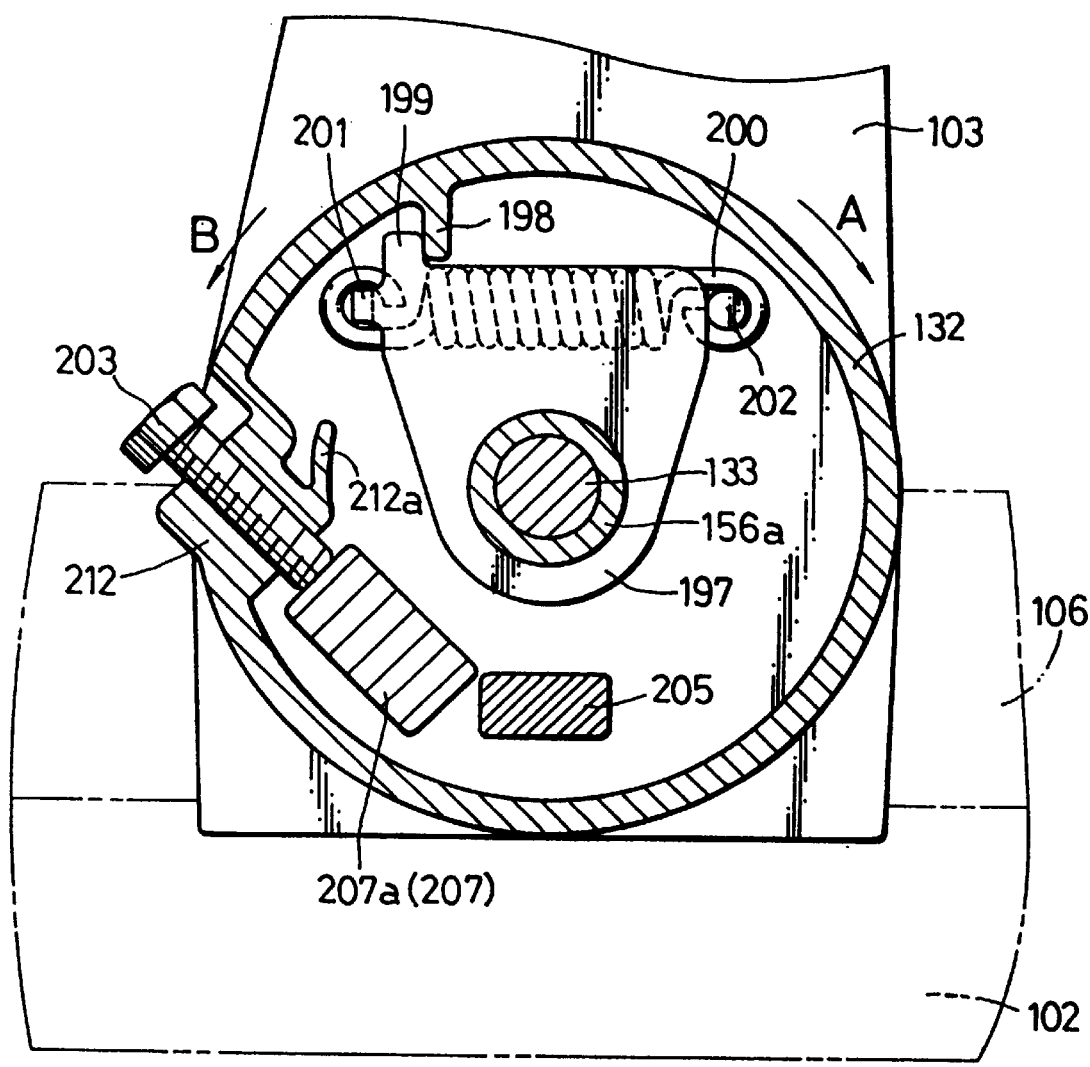
FIG. 23 is a sectional view taken along line XXIII—XXIII in FIG. 21.
Figure 24:
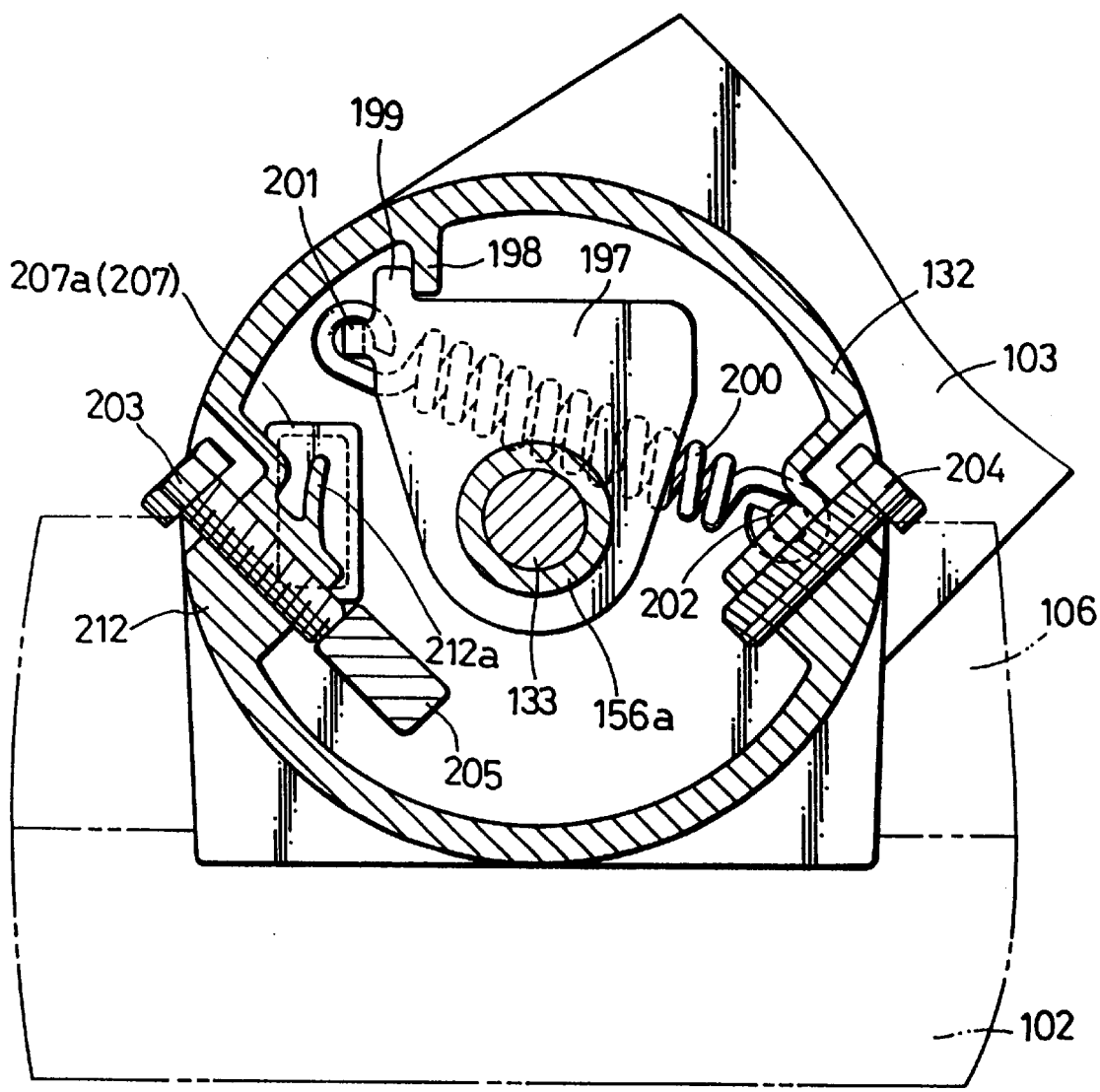
FIG. 24 is a sectional view similar to FIG. 22 but showing the support member pivoted in the rightward direction.

As shown in FIG. 21, a guide sleeve 208 is integrally formed with the lower part of the rotational portion 135 and is disposed therewithin. The guide sleeve 208 extends in the axial direction and is positioned adjacent the stopper member 205 in the clockwise direction. A stopper shaft 207 having a rectangular configuration in section is slidably received within the guide sleeve 208. An operational rod 209 is threadably engaged with the forward portion of the stopper shaft 207. The rear end of the operational rod 209 extends outwardly from the rotational portion 135 and includes a spherical operational knob 210 fixed thereto. A compression coil spring 211 is disposed within the guide sleeve 208 and is fitted around the operational rod 209. The compression spring 211 serves to normally bias the stopper shaft 207 together with the operational rod 209 in the forward direction. Thus, the stopper shaft 207 is normally kept by the biasing force of the compression spring 211 at an extended position where the operational knob 210 abuts on the outer surface of the rotational portion 135. At the extended position, a forward portion 207a of the stopper shaft 107 serves to abut on the end portion of the left stopper bolt 203 as shown in FIG. 23. The forward portion 207a is enlarged relative to the other portion of the stopper shaft 207, so that the forward portion 207a abuts on the forward end of the guide sleeve 208 when the operator pulls the operational knob 210 rearwardly against the biasing force of the compression spring 211 as shown by a dotted line in FIG. 21. The stopper shaft 207 thus retracted may not be interfered with the left stopper bolt 203 as well as a mounting portion 212 of the left side stopper bolt 203 when the support member 103 is pivoted. Further, the mounting portion 212a includes a protrusion 212 formed on the side of the clockwise direction thereof and extends in the circumferential direction. The function of the protrusion 212a will be explained later.

The operation of the third embodiment will now be explained. When the support member 103 is at the vertical position, the engaging portion 199 is in engagement with the engaging projection 198 of the support portion 132. On the other hand, as described above, the tension coil spring 200 biases the rotational portion 135 in the counterclockwise direction (direction B) against the moment of the miter saw unit 104 in the clockwise direction (direction A). At this stage, by the moment of the miter saw unit 104 in the direction A which surmounts the biasing force of the tension coil spring 200, the forward portion 207a of the stopper shaft 207 abuts on the end portion of the left stopper bolt 203 as shown in FIG. 23, so that the vertical position of the support member 103 is determined. The rotational portion 135 is fixed in position relative to the support portion 132 through turning operation of the handle 141 as is the case of the second embodiment, and the vertical cutting operation can be performed in the same manner as the second embodiment.

In order to perform the oblique cutting operation with the support member 103 pivoted in the rightward direction (direction A), the operator operates the handle 141 to release the rotational portion 135 from the support portion 132. The operator subsequently pulls the operational knob 210 of the stopper shaft 217 of the stopper mechanism 206 rearwardly, so that the forward portion 207a of the stopper shaft 207 is moved away from the position for abutment on the left stopper bolt 203. Then, the support member 103 automatically pivots rightwardly by the moment of the miter saw unit 104 in the direction A. As the support member 103 is thus pivoted, the distance between the hook portion 201 of the lever 197 and the hook shaft 202 of the rotational portion 135 becomes larger, so that the biasing force of the tension coil spring 200 in the opposite direction of the pivotal movement increases as the pivoted angle increases. Therefore, a smaller force is required for the operator to support the miter saw unit 104 through the handle 196. Further, when the support member 103 is thus pivoted, the stopper shaft 207 of the stopper mechanism 206 is moved to a position on the rear side of the mounting portion 212 in the axial direction. Therefore, when the operator releases the operational knob 210, the forward portion 207a of the stopper shaft 207 abuts on the rear surface of the mounting portion 212 and the forward portion 207a slidably moves along the rear surface as the pivotal movement. Thus, the pivotal movement of the support member 103 can be smoothly performed without being prevented by the stopper shaft 207.

The pivotal movement of the support member 103 is stopped when the lateral surface of the stopper member 205 abuts on the end portion of the left stopper bolt 203. Then, the operator turns the handle 141 to fix the rotational portion 135 in position relative to the support portion 132, so that the oblique cutting operation can be performed with the support member 103 pivoted in the rightward direction. As the pivotal movement occurs, the stopper shaft 207 of the stopper mechanism 206 moves beyond the mounting portion 212 of the left stopper bolt 203 in the clockwise direction to some extent. However, the projection 212a is formed with the mounting portion 212, and therefore, the forward portion 207a of the stopper shaft 207 is kept in abutment on the projection 212a and may not be returned to the extended portion.

For the oblique cutting operation with the support member 103 pivoted in the leftward direction (direction B), the operator operates the handle 141 to release the rotational portion 135 from the support portion 132. The operator then pivots the miter saw unit 104, which is in the vertical position, leftwardly against the moment of the miter saw unit 104 with the aid of the biasing force of the tension coil spring 200. The biasing force of the tension coil spring 200 is no more applied when the support member 103 is pivoted beyond the neutral position, and thereafter pivotal operation is performed with the operator supporting the miter saw unit 104 through the handle 196 without the aid of the biasing force. During the pivotal movement, the stopper shaft 207 of the stopper mechanism 206 passes through the lower space within the support portion 132 formed between the left stopper bolt 203 and the right stopper bolt 204. Since there exists no parts in the lower space which may prevent movement of the stopper shaft 207, it is not required to pull the operational knob 210 of the stopper mechanism 206 for this pivotal operation.

Figure 25:
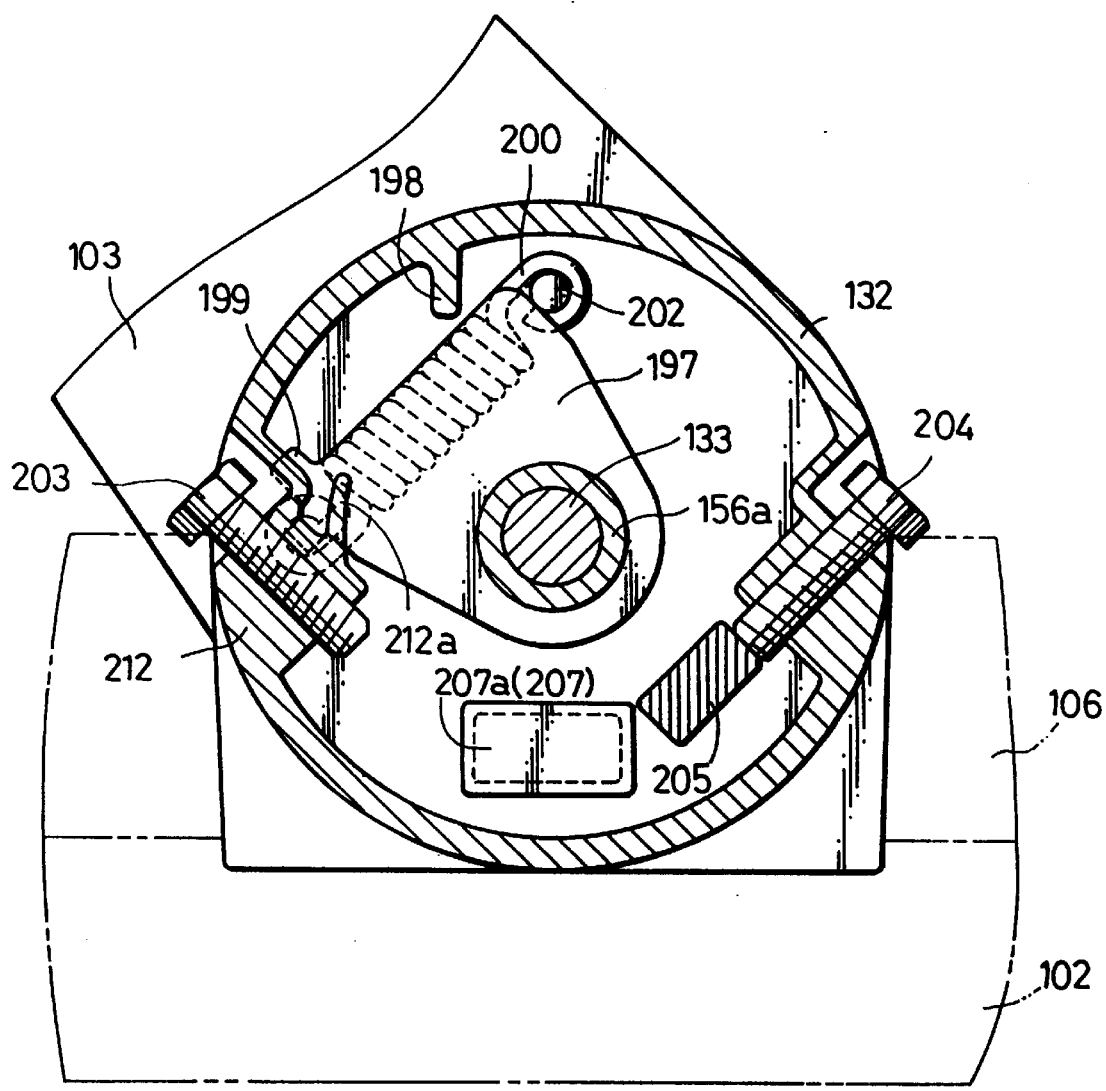
FIG. 25 is a sectional view similar to FIG. 22 but showing the support member pivoted in the leftward direction.

The pivotal movement of the support member 103 is stopped when the lateral surface of the stopper member 205 abuts on the end portion of the right stopper bolt 204 as shown in FIG. 25. Then, the operator turns the handle 141 to fix the rotational portion 135 In position relative to the support portion 132, so that the oblique cutting operation can be performed with the support member 103 pivoted in the leftward direction.

While the invention has been described with reference to preferred embodiments, it is to be understood that modifications or variation may be easily made without departing from the spirit of this invention which is defined by the appended claims.

What is claimed is:

1. Miter saw comprising:
   a base for placing a work thereon;
   a miter saw unit having a saw blade supported thereon, said miter saw unit being laterally pivotable relative to said base about a pivotal axis from a vertical position;
   a first stopper and a second stopper mounted on one and the other of said miter saw unit and said base, respectively, and operable to abut on each other in a pivotal direction of said miter saw unit for determining said vertical position of said miter saw unit;
   said first stopper being movable between a first position for abutment on said second stopper and a second position away from said first position, and said first stopper in said second position permitting said miter saw unit to pivot from said vertical position in said pivotal direction; and
   holding means for holding said first stopper in said first position and said second position when said miter saw unit is in said vertical position and a pivoted position in said pivotal direction, respectively, said holding means being operable to move said first stopper from said second position to said first position when said miter saw unit is moved from said pivoted position to said vertical position.

2. The miter saw as defined in claim 1 wherein said holding means includes biasing means and wall means, said biasing means serving to normally bias said first stopper in a direction toward said first position, and said wall means being provided on the other of said base and said miter saw unit, so that, when an operator releases said first stopper after the operator moves said first stopper from said first position to said second position and after said miter saw unit is pivoted from said vertical position toward said pivoted position, said first stopper is held in said second position by said wall means against the biasing force of said biasing means, and so that said first stopper is moved from said second position to said first position by the biasing force of said biasing means when said miter saw unit returns from said pivoted position to said vertical position.

3. The miter saw as defined in claim 2 wherein said first stopper is pivotable between said first position and said second position about an axis parallel to said pivotal axis of said miter saw unit, and wherein said wall means includes a first surface having an arcuate configuration about said pivotal axis, so that said first stopper in said second position slidably contacts said first surface.

4. The miter saw as defined in claim 3 further including second wall means provided on the other of said base and said miter saw unit, said second wall means including a second surface having an arcuate configuration about said pivotal axis, said second surface having a diameter different from that of said first surface and being formed in continuity with said first surface via a stepped portion, so that said first stopper is held in said first position through abutment on said second surface when said miter saw unit is in said vertical position.

5. The miter saw as defined in claim 2 wherein said first stopper is movable between said first position and said second position in an axial direction parallel to said pivotal axis, and wherein said wall means includes a flat surface which confronts said first stopper in said axial direction when said miter saw unit is in said pivoted position, so that said first stopper in said second position slidably abuts on said flat surface.

6. The miter saw as defined in claim 5 wherein said first stopper is slidably movable in said axial direction relative to one of said base and said miter saw unit, and further including means provided on one of said base and said miter saw unit for holding said first stopper in said first position when said miter saw unit is in said vertical position.

* * * * *